US012771014B2

(12) United States Patent
Marin et al.

(10) Patent No.: US 12,771,014 B2
(45) Date of Patent: Oct. 20, 2026

(54) ELECTRONIC DEVICE HAVING DISPLAY ANTENNA WITH CANTED COIL SPRING

(71) Applicant: Apple Inc., Cupertino, CA (US)

(72) Inventors: Cole Marin, Mountain View, CA (US); Sameer Pandya, Sunnyvale, CA (US); Eric T Chiang, San Francisco, CA (US); Daniela M Deschamps, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 627 days.

(21) Appl. No.: 18/320,971

(22) Filed: May 20, 2023

(65) Prior Publication Data

US 2024/0387984 A1 Nov. 21, 2024

(51) Int. Cl.

| | |
|---|---|
| ***H01Q 1/27*** | (2006.01) |
| ***G04G 17/04*** | (2006.01) |
| ***G04G 21/04*** | (2013.01) |
| ***H01Q 1/48*** | (2006.01) |
| ***H01Q 9/04*** | (2006.01) |

(52) U.S. Cl.
CPC ........... *H01Q 1/273* (2013.01); *G04G 17/045* (2013.01); *G04G 21/04* (2013.01); *H01Q 1/48* (2013.01); *H01Q 9/045* (2013.01)

(58) Field of Classification Search
CPC .......... H01Q 1/273; H01Q 1/22; H01Q 1/243; H01Q 1/38; H01Q 1/48; H01Q 9/0407–0414; H01Q 13/10; G04G 21/04; G04R 60/08–12
See application file for complete search history.

(56) References Cited

U.S. PATENT DOCUMENTS

| | | | | |
|---|---|---|---|---|
| 9,335,743 B2 * | 5/2016 | Akiyama | ............... | G04R 20/04 |
| 9,658,604 B2 | 5/2017 | Nagahama | | |
| 10,355,344 B1 * | 7/2019 | Ruaro | .................... | H01Q 1/273 |
| 10,515,757 B2 | 12/2019 | Kim et al. | | |
| 10,862,216 B1 * | 12/2020 | Ayala Vazquez | ...... | H01Q 21/28 |
| 10,879,606 B2 | 12/2020 | Ruaro et al. | | |
| 11,271,292 B2 | 3/2022 | Wang et al. | | |
| 11,520,295 B2 * | 12/2022 | Baba | ...................... | G04R 20/02 |
| 11,557,825 B2 | 1/2023 | Foo et al. | | |

(Continued)

FOREIGN PATENT DOCUMENTS

| | | |
|---|---|---|
| JP | 2015180830 A | 10/2015 |
| KR | 20180032902 A | 4/2018 |

*Primary Examiner* — Hasan Islam
(74) *Attorney, Agent, or Firm* — Treyz Law Group, P.C.; Michael H. Lyons

(57) ABSTRACT

An electronic device such as a wristwatch may be provided with a housing and an antenna. The housing may include conductive sidewalls, a conductive turret, and a conductive bridge. The turret may be separated from the sidewalls by a slot. The bridge may couple the turret to the sidewalls across the slot. A display may be mounted to the turret. A canted coil spring may be disposed in a recess of the conductive turret and may couple conductive structures from the display to the turret. The conductive structures, the turret, and the canted coil spring may collectively form a patch antenna resonating element for the antenna. Since the canted coil spring and conductive turret are not permanently affixed or welded to the display, the display may be easily removed from the device for repair or replacement.

20 Claims, 15 Drawing Sheets

(56) References Cited

U.S. PATENT DOCUMENTS

| | | | | |
|---|---|---|---|---|
| 2019/0081396 | A1* | 3/2019 | Zhou | H05K 5/0247 |
| 2019/0103688 | A1* | 4/2019 | Pandya | G04G 17/045 |
| 2021/0096515 | A1 | 4/2021 | Ruaro et al. | |
| 2022/0077565 | A1 | 3/2022 | Samardzija et al. | |
| 2022/0261048 | A1 | 8/2022 | Park et al. | |
| 2023/0091853 | A1 | 3/2023 | Parker et al. | |

* cited by examiner

ELECTRONIC DEVICE HAVING DISPLAY ANTENNA WITH CANTED COIL SPRING

FIELD

This relates to electronic devices and, more particularly, to electronic devices with wireless circuitry.

BACKGROUND

Electronic devices are often provided with wireless communications capabilities. To satisfy consumer demand for small form factor electronic devices, manufacturers are continually striving to implement wireless circuitry such as antenna components using compact structures. At the same time, larger antenna volumes generally allow antennas to exhibit greater efficiency bandwidth.

In addition, because antennas have the potential to interfere with each other and with other components in a wireless device, care should be taken when incorporating antennas into an electronic device to ensure that the antennas and wireless circuitry are able to exhibit satisfactory performance over a wide range of operating frequencies. Care should also be taken to provide robust electrical connections between conductive components of the antennas.

SUMMARY

An electronic device such as a wristwatch may be provided with a housing and wireless circuitry. The wireless circuitry may include an antenna. The housing may include conductive sidewalls, a conductive turret, and a conductive bridge. The conductive sidewalls may form a ground for the antenna. The conductive turret may be vertically separated from the conductive sidewalls by an elongated slot. The conductive bridge may couple the conductive turret to the conductive sidewalls across the elongated slot. The conductive bridge may form a short path for the antenna.

A display may be mounted to the conductive turret. The display may include conductive display structures and a display cover layer overlapping the conductive display structures. A canted coil spring may be disposed in a recess of the conductive turret. The canted coil spring may couple the conductive display structures to the conductive turret. The conductive turret may laterally surround the display.

The canted coil spring may be a ring-shaped canted coil spring laterally surrounding the display. The canted coil spring may exert a spring force radially outward against the conductive turret and radially inwards against the display. The canted coil spring may provide a robust and stable electrical connection between the conductive display structures and the conductive turret at all points around the lateral periphery of the display. This may allow the conductive display structures, the conductive turret, and the canted coil spring to collectively form a stable and robust patch antenna resonating element for the antenna. Since the canted coil spring does not need to be welded to the conductive turret, the display may be easily removed from the device for repair or replacement.

DETAILED DESCRIPTION

Figure 1:
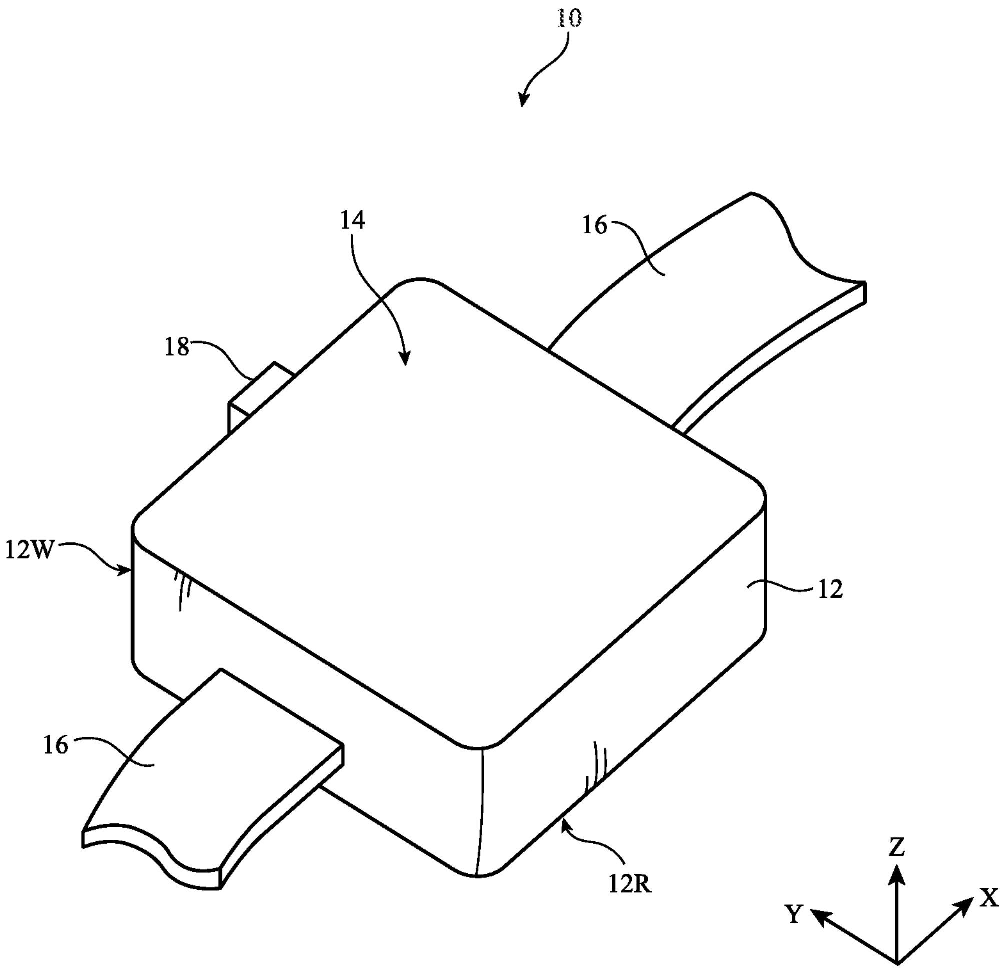
FIG. 1 is a perspective view of an illustrative electronic device with wireless circuitry in accordance with some embodiments.

Electronic devices such as electronic device 10 of FIG. 1 may be provided with wireless circuitry (sometimes referred to herein as wireless communications circuitry). The wireless circuitry may be used to support wireless communications in multiple wireless communications bands. Communications bands (sometimes referred to herein as frequency bands) handled by the wireless circuitry can include satellite navigation system communications bands, cellular telephone communications bands, wireless local area network communications bands, wireless personal area network communications bands, near-field communications bands, ultra-wideband communications bands, or other wireless communications bands.

The wireless circuitry may include one or more antennas. The antennas of the wireless circuitry can include patch antennas (e.g., shorted patch antennas), loop antennas, inverted-F antennas, strip antennas, planar inverted-F antennas, slot antennas, hybrid antennas that include antenna structures of more than one type, or other suitable antennas.

Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a wristwatch (e.g., a smart watch). Other configurations may be used for device 10 if desired. The example of FIG. 1 is merely illustrative.

In the example of FIG. 1, device 10 includes a display such as display 14. Display 14 may be mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). Housing 12 may have metal sidewalls such as sidewalls 12W or sidewalls formed from other materials. Examples of metal materials that may be used for forming sidewalls 12W include stainless steel, aluminum, silver, gold, metal alloys, or any other desired conductive material. Sidewalls 12W may sometimes be referred to herein as housing sidewalls 12W or conductive housing sidewalls 12W.

Display 14 may be formed at (e.g., mounted on) the front side (face) of device 10. Housing 12 may have a rear housing wall on the rear side (face) of device 10 such as rear housing wall 12R that opposes the front face of device 10. Conductive housing sidewalls 12W may surround the periphery of device 10 (e.g., conductive housing sidewalls 12W may extend around peripheral edges of device 10). Rear housing wall 12R may be formed from conductive materials and/or dielectric materials. Examples of dielectric materials that may be used for forming rear housing wall 12R include plastic, glass, sapphire, ceramic, wood, polymer, combinations of these materials, or any other desired dielectrics.

Rear housing wall 12R and/or display 14 may extend across some or all of the length (e.g., parallel to the X-axis of FIG. 1) and width (e.g., parallel to the Y-axis) of device 10. Conductive housing sidewalls 12W may extend across some or all of the height of device 10 (e.g., parallel to Z-axis). Conductive housing sidewalls 12W and/or rear housing wall 12R may form one or more exterior surfaces of device 10 (e.g., surfaces that are visible to a user of device 10) and/or may be implemented using internal structures that do not form exterior surfaces of device 10 (e.g., conductive or dielectric housing structures that are not visible to a user of device 10 such as conductive structures that are covered with layers such as thin cosmetic layers, protective coatings, and/or other coating layers that may include dielectric materials such as glass, ceramic, plastic, or other structures that form the exterior surfaces of device 10 and/or serve to hide housing walls 12R and/or 12W from view of the user).

If desired, housing 12 may include one or more dielectric-filled slots. The dielectric-filled slots, sometimes referred to herein as gaps, openings, or splits, may divide the conductive material in housing 12 into different conductive housing portions. The slots may be filled with dielectric material such as plastic, polymer, sapphire, glass, rubber, or ceramic. In one implementation that is described herein as an example, housing 12 may include a slot that extends along three of the four peripheral edges of device 10 and that separates conductive housing sidewalls 12W from a conductive upper portion of housing 12 (sometimes referred to herein as a conductive turret, conductive top portion, conductive ring, or conductive bezel of housing 12) along three sides of device 10. The slot may be used to separate a radiating element in an antenna of device 10 from ground structures in the antenna. This may allow the radiating element to conduct antenna currents along its edges (e.g., at the slot) that produces electric fields associated with the transmission and/or reception of radio-frequency signals.

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures. Display 14 may also be force sensitive and may gather force input data associated with how strongly a user or object is pressing against display 14.

Display 14 may include an array of display pixels formed from liquid crystal display (LCD) components, an array of electrophoretic display pixels, an array of plasma display pixels, an array of organic light-emitting diode (OLED) display pixels, an array of electrowetting display pixels, or display pixels based on other display technologies. Display 14 may be protected using a display cover layer. The display cover layer may be formed from a transparent material such as glass, plastic, sapphire or other crystalline dielectric materials, ceramic, or other clear materials. The display cover layer may extend across substantially all of the length and width of device 10, for example.

Device 10 may include buttons such as button 18. There may be any suitable number of buttons in device 10 (e.g., a single button, more than one button, two or more buttons, five or more buttons, etc.). Buttons may be located in openings in housing 12 (e.g., openings in conductive housing sidewall 12W or rear housing wall 12R) or in an opening in display 14 (as examples). Buttons may be rotary buttons, sliding buttons, buttons that are actuated by pressing on a movable button member, etc. Button members for buttons such as button 18 may be formed from metal, glass, plastic, or other materials. Button 18 may sometimes be referred to as a crown in scenarios where device 10 is a wristwatch device.

Device 10 may, if desired, be coupled to a strap such as strap 16. Strap 16 may be used to hold device 10 against a user's wrist (as an example). Strap 16 may sometimes be referred to herein as wrist strap 16. In the example of FIG. 1, wrist strap 16 is connected to opposing sides of device 10. Conductive housing sidewalls 12W may include attachment structures for securing wrist strap 16 to housing 12 (e.g., lugs or other attachment mechanisms that configure housing 12 to receive wrist strap 16). Wrist strap 16 may be removable if desired. Configurations that do not include straps may also be used for device 10.

Figure 2:
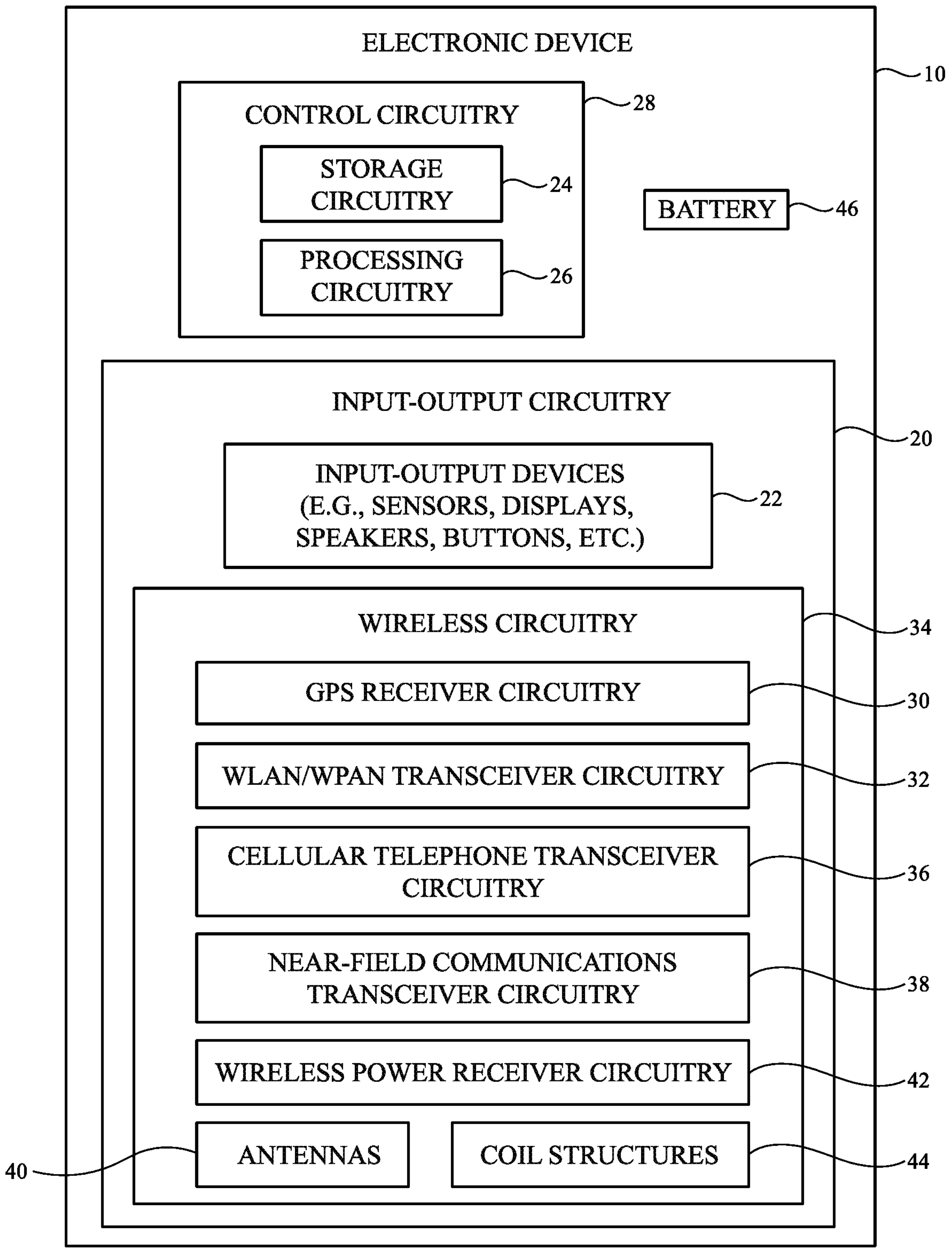
FIG. 2 is a schematic diagram of an illustrative electronic device with wireless circuitry in accordance with some embodiments.

A schematic diagram showing illustrative components that may be used in device 10 is shown in FIG. 2. As shown in FIG. 2, device 10 may include control circuitry 28. Control circuitry 28 may include storage such as storage circuitry 24. Storage circuitry 24 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 28 may include processing circuitry such as processing circuitry 26. Processing circuitry 26 may be used to control the operation of device 10. Processing circuitry 26 may include on one or more processors such as microprocessors, microcontrollers, digital signal processors, host processors, baseband processor integrated circuits, application specific integrated circuits, central processing units (CPUs), graphics processing units, etc. Control circuitry 28 may be configured to perform operations in device 10 using hardware (e.g., dedicated hardware or circuitry), firmware, and/or software. Software code for performing operations in device 10 may be stored on storage circuitry 24 (e.g., storage circuitry 24 may include non-transitory (tangible) computer readable storage media that stores the software code). The software code may sometimes be referred to as program instructions, software, data, instructions, or code. Software code stored on storage circuitry 24 may be executed by processing circuitry 26.

Control circuitry 28 may be used to run software on device 10 such as external node location applications, satellite navigation applications, internet browsing applications, voice-over-internet-protocol (VOIP) telephone call applications, email applications, media playback applications, operating system functions, etc. To support interactions with external equipment, control circuitry 28 may be used in implementing communications protocols. Communications protocols that may be implemented using control circuitry 14 include internet protocols, wireless local area network (WLAN) protocols (e.g., IEEE 802.11 protocols-sometimes referred to as Wi-Fi®), protocols for other short-range wireless communications links such as the Bluetooth® protocol or other wireless personal area network (WPAN) protocols, IEEE 802.11ad protocols (e.g., ultra-wideband (UWB) protocols), cellular telephone protocols (e.g., 3G protocols, 4G (LTE) protocols, 3GPP Fifth Generation (5G) New Radio (NR) protocols, Sixth Generation (6G) protocols, sub-THz protocols, THz protocols, etc.), antenna diversity protocols, satellite navigation system protocols (e.g., global positioning system (GPS) protocols, global navigation satellite system (GLONASS) protocols, etc.), antenna-based spatial ranging protocols, optical communications protocols, or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch screens, displays without touch sensor capabilities, buttons, scrolling wheels, touch pads, key pads, keyboards, microphones, cameras, buttons, speakers, status indicators, light sources, audio jacks and other audio port components, vibrators or other haptic feedback engines, digital data port devices, light sensors (e.g., infrared light sensors, visible light sensors, etc.), light-emitting diodes, motion sensors (accelerometers), capacitance sensors, proximity sensors, magnetic sensors, force sensors (e.g., force sensors coupled to a display to detect pressure applied to the display), etc.

Input-output circuitry 22 may include wireless circuitry 34. Wireless circuitry 34 may include wireless power receiving coil structures such as coil structures 44 and wireless power receiver circuitry such as wireless power receiver circuitry 42. Device 10 may use wireless power receiver circuitry 42 and coil structures 44 to receive wirelessly transmitted power (e.g., wireless charging signals) from a wireless power adapter (e.g., a wireless power transmitting device such as a wireless charging mat or other device). Coil structures 44 may include one or more inductive coils that use resonant inductive coupling (near field electromagnetic coupling) with a wireless power transmitting coil on the wireless power adapter.

The wireless power adapter may pass AC currents through the wireless power transmitting coil to produce a time varying electromagnetic (e.g., magnetic) field that is received as wireless power (wireless charging signals) by coil structures 44 in device 10. An illustrative frequency for the wireless charging signals is 200 kHz. Other frequencies may be used, if desired (e.g., frequencies in the kHz range, the MHz range, or in the GHz range, frequencies of 1 kHz to 1 MHz, frequencies of 1 kHz to 100 MHz, frequencies less than 100 MHz, frequencies less than 1 MHZ, etc.). When the time varying electromagnetic field is received by coil structures 44, corresponding alternating-current (AC) currents are induced in the coil structures. Wireless power receiver circuitry 42 may include converter circuitry such as rectifier circuitry. The rectifier circuitry may include rectifying components such as synchronous rectification metal-oxide-semiconductor transistors arranged in a bridge network, and may convert these currents from coil structures 44 into a DC voltage for powering device 10. The DC voltage produced by the rectifier circuitry in wireless power receiver circuitry 42 can be used in powering (charging) an energy storage device such as battery 46 and can be used in powering other components in device 10.

To support wireless communications, wireless circuitry 34 may include baseband circuitry (e.g., one or more baseband processors or other circuitry that operates on baseband signals) and radio-frequency (RF) transceiver circuitry formed from one or more integrated circuits, power amplifier circuitry, low-noise input amplifiers, passive RF components, mixer circuitry, synthesizers, modulators, demodulators, upconverters, downconverters, etc. Wireless circuitry 34 may also include one or more antennas such as antennas 40, transmission lines, and other circuitry for handling RF wireless signals. One or more radio-frequency front end modules may be disposed along the transmission lines if desired. Wireless signals can also be sent using light (e.g., using infrared communications).

Wireless circuitry 34 may include radio-frequency transceiver circuitry for handling transmission and/or reception of radio-frequency signals within corresponding frequency bands at radio frequencies (sometimes referred to herein as communications bands or simply as "bands"). For example, wireless circuitry 34 may include wireless local area network (WLAN) and wireless personal area network (WPAN) transceiver circuitry 32. Transceiver circuitry 32 may handle a 2.4 GHZ WLAN band (e.g., from 2400 to 2480 MHZ), a 5 GHz WLAN band (e.g., from 5180 to 5825 MHZ), a Wi-Fi® 6E band (e.g., from 5925-7125 MHZ), and/or other Wi-Fi® bands (e.g., from 1875-5160 MHz or at other frequencies). Transceiver circuitry 32 may sometimes be referred to herein as WLAN/WPAN transceiver circuitry 32.

Wireless circuitry 34 may use cellular telephone transceiver circuitry 36 for handling wireless communications in frequency ranges (communications bands) such as a cellular low band (LB) from 600 to 960 MHz, a cellular low-midband (LMB) from 1410 to 1510 MHz, a cellular mid-band (MB) from 1710 to 2170 MHz, a cellular high band (HB) from 2300 to 2700 MHz, a cellular ultra-high band (UHB) from 3300 to 5000 MHz, or other communications bands between 600 MHz and 5000 MHz or other suitable frequencies, 2G bands, 3G bands, 4G LTE bands, 3GPP 5G New Radio Frequency Range 1 (FR1) bands below 10 GHz, 3GPP 5G New Radio (NR) Frequency Range 2 (FR2) bands between 20 and 60 GHz, or other centimeter or millimeter wave frequency bands between 10-100 GHz (as examples). Cellular telephone transceiver circuitry 36 may handle voice data and non-voice data.

Wireless circuitry 34 may include satellite navigation system circuitry such as Global Positioning System (GPS) receiver circuitry 30. GPS receiver circuitry 30 may receive GPS signals in satellite navigation frequency bands such as the Global Positioning System (GPS) L1 band (e.g., at 1575 MHz), L2 band (e.g., at 1228 MHz), L3 band (e.g., at 1381 MHZ), L4 band (e.g., at 1380 MHz), and/or L5 band (e.g., at 1176 MHZ), a Global Navigation Satellite System (GLONASS) band, a BeiDou Navigation Satellite System (BDS) band, or other bands. Satellite navigation system signals for receiver circuitry 30 are received from a constellation of satellites orbiting the earth.

Wireless circuitry 34 can include circuitry for other short-range and long-range wireless links if desired. For example, wireless circuitry 34 may include circuitry for receiving television and radio signals, paging system transceivers, near field communications (NFC) transceiver circuitry 38 (e.g., an NFC transceiver operating at 13.56 MHz or another suitable frequency), ultra-wideband transceiver circuitry (e.g., transceiver circuitry that operates at ultra-wideband (UWB) frequency bands under the IEEE 802.15.4 protocol and/or other ultra-wideband communications protocols (e.g., a first UWB communications band at 6.5 GHZ and/or a second UWB communications band at 8.0 GHZ)), transceiver circuitry that operates using communications bands under the family of 3GPP wireless communications standards, transceiver circuitry that operates using communications bands under the IEEE 802.XX family of standards, transceiver circuitry that operates using industrial, scientific, and medical (ISM) bands such as an ISM band between around 900 MHz and 950 MHz or other ISM bands below or above 1 GHz, transceiver circuitry that operates using one or more unlicensed bands, transceiver circuitry that operates using one or more bands reserved for emergency and/or public services, and/or any other desired frequency bands of interest. Wireless circuitry 34 may also be used to perform spatial ranging operations if desired.

In NFC links, wireless signals are typically conveyed over a few inches at most. In satellite navigation system links, cellular telephone links, and other long-range links, wireless signals are typically used to convey data over thousands of feet or miles. In WLAN and WPAN links at 2.4 and 5 GHz and other short-range wireless links, wireless signals are typically used to convey data over tens or hundreds of feet. Antenna diversity schemes may be used if desired to ensure that the antennas that have become blocked or that are otherwise degraded due to the operating environment of device 10 can be switched out of use and higher-performing antennas used in their place. Multiple-input and multiple-output (MIMO) schemes and/or carrier aggregation (CA) schemes may be used to boost data rates and wireless performance.

Wireless circuitry 34 may include antennas 40. Antennas 40 may be formed using any suitable antenna types. For example, antennas 40 may include antennas with resonating elements that are formed from patch antenna structures (e.g., shorted patch antenna structures), slot antenna structures, loop antenna structures, stacked patch antenna structures, antenna structures having parasitic elements, inverted-F antenna structures, planar inverted-F antenna structures, helical antenna structures, monopole antennas, dipole antenna structures, Yagi (Yagi-Uda) antenna structures, surface integrated waveguide structures, hybrids of these designs, etc. If desired, one or more of antennas 40 may be cavity-backed antennas. Two or more antennas 40 may be arranged in a phased antenna array if desired (e.g., for conveying centimeter and/or millimeter wave signals within a signal beam formed in a desired beam pointing direction that may be steered/adjusted over time).

Different types of antennas may be used for different bands and combinations of bands. For example, one type of antenna may be used in forming a local wireless link antenna whereas another type of antenna is used in forming a remote wireless link antenna. If desired, space may be conserved within device 10 by using a single antenna to handle two or more different communications bands. If desired, a combination of antennas for covering multiple frequency bands and dedicated antennas for covering a single frequency band may be used. For example, a first antenna 40 in device 10 may be used to handle communications in a Wi-Fi® or Bluetooth® communication band at 2.4 GHz, a GPS L1 band at 1575 MHz, a GPS L5 band at 1176 MHz, and one or more cellular telephone communications bands such as a cellular midband (MB) from 1710 to 2170 MHz, a cellular high band (HB) from 2300 to 2700 MHZ, whereas a second antenna 40 in device 10 is used to handle communications in a cellular low band (LB) and the cellular HB.

It may be desirable to implement at least some of the antennas in device 10 using portions of electrical components that would otherwise not be used as antennas and that support additional device functions. As an example, it may be desirable to produce antenna currents in components such as display 14 (FIG. 1), so that display 14 and/or other electrical components (e.g., a touch sensor, near-field communications loop antenna, conductive display assembly or housing, conductive shielding structures, etc.) can serve as part of an antenna for Wi-Fi, Bluetooth, GPS, cellular frequencies, and/or other frequencies without the need to incorporate separate bulky antenna structures in device 10. Conductive portions of housing 12 (FIG. 1) may be used to form part of an antenna ground for one or more antennas 40.

While control circuitry 28 is shown separately from wireless circuitry 34 in the example of FIG. 1 for the sake of clarity, wireless circuitry 34 may include processing circuitry (e.g., one or more processors) that forms a part of processing circuitry 26 and/or storage circuitry that forms a part of storage circuitry 24 of control circuitry 28 (e.g., portions of control circuitry 28 may be implemented on wireless circuitry 34). As an example, control circuitry 28 may include baseband circuitry (e.g., one or more baseband processors), digital control circuitry, analog control circuitry, and/or other control circuitry that forms part of radio wireless circuitry 34. The baseband circuitry may, for example, access a communication protocol stack on control circuitry 28 (e.g., storage circuitry 24) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer. If desired, the PHY layer operations may additionally or alternatively be performed by radio-frequency (RF) interface circuitry in wireless circuitry 34.

Figure 3:
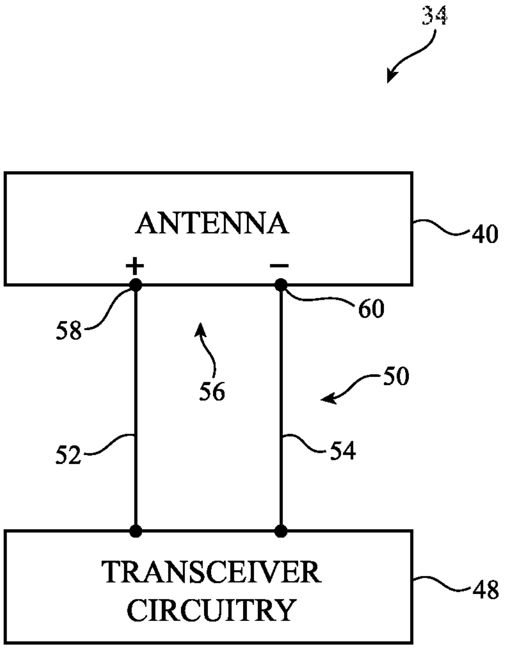
FIG. 3 is a diagram of illustrative wireless circuitry in an electronic device in accordance with some embodiments.

A schematic diagram of wireless circuitry 34 is shown in FIG. 3. As shown in FIG. 3, wireless circuitry 34 may include transceiver circuitry 48 (e.g., cellular telephone transceiver circuitry 36 of FIG. 2, WLAN/WPAN transceiver circuitry 32, etc.) that is coupled to a given antenna 40 using a radio-frequency transmission line path such as radio-frequency transmission line path 50.

To provide antenna structures such as antenna 40 with the ability to cover different frequencies of interest, antenna 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna 40 may be provided with adjustable circuits such as tunable components that tune the antenna over communications (frequency) bands of interest. The tunable components may be part of a tunable filter or tunable impedance matching network, may be part of an antenna resonating element, may span a gap between an antenna resonating element and antenna ground, etc.

Radio-frequency transmission line path 50 may include one or more radio-frequency transmission lines (sometimes referred to herein simply as transmission lines). Radio-frequency transmission line path 50 (e.g., the transmission lines in radio-frequency transmission line path 50) may include a positive signal conductor such as signal conductor 52 and a ground signal conductor such as ground conductor 54.

The transmission lines in radio-frequency transmission line path 50 may, for example, include coaxial cable transmission lines (e.g., ground conductor 54 may be implemented as a grounded conductive braid surrounding signal conductor 52 along its length), stripline transmission lines (e.g., where ground conductor 54 extends along two sides of signal conductor 52), a microstrip transmission line (e.g., where ground conductor 54 extends along one side of signal conductor 52), coaxial probes realized by a metalized via, edge-coupled microstrip transmission lines, edge-coupled stripline transmission lines, waveguide structures (e.g., coplanar waveguides or grounded coplanar waveguides), combinations of these types of transmission lines and/or other transmission line structures, etc.

Transmission lines in radio-frequency transmission line path 50 may be integrated into rigid and/or flexible printed circuit boards. In one suitable arrangement, radio-frequency transmission line path 50 may include transmission line conductors (e.g., signal conductors 52 and ground conductors 54) integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

A matching network may include components such as inductors, resistors, and capacitors used in matching the impedance of antenna 40 to the impedance of radio-frequency transmission line path 50. Matching network components may be provided as discrete components (e.g., surface mount technology components) or may be formed from housing structures, printed circuit board structures, traces on plastic supports, etc. Components such as these may also be used in forming filter circuitry in antenna(s) 40 and may be tunable and/or fixed components.

Radio-frequency transmission line path 50 may be coupled to antenna feed structures associated with antenna 40. As an example, antenna 40 may form an inverted-F antenna, a planar inverted-F antenna, a patch antenna, a loop antenna, or other antenna having an antenna feed 56 with a positive antenna feed terminal such as terminal 58 and a ground antenna feed terminal such as terminal 60. Positive antenna feed terminal 58 may be coupled to an antenna resonating (radiating) element within antenna 40. Ground antenna feed terminal 60 may be coupled to an antenna ground in antenna 40. Signal conductor 52 may be coupled to positive antenna feed terminal 58 and ground conductor 54 may be coupled to ground antenna feed terminal 60.

Other types of antenna feed arrangements may be used if desired. For example, antenna 40 may be fed using multiple feeds each coupled to a respective port of transceiver circuitry 48 over a corresponding transmission line. If desired, signal conductor 52 may be coupled to multiple locations on antenna 40 (e.g., antenna 40 may include multiple positive antenna feed terminals coupled to signal conductor 52 of the same radio-frequency transmission line path 50). Switches may be interposed on the signal conductor between transceiver circuitry 48 and the positive antenna feed terminals if desired (e.g., to selectively activate one or more positive antenna feed terminals at any given time). The illustrative feeding configuration of FIG. 3 is merely illustrative.

The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to free space through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Device 10 may include multiple antennas that convey radio-frequency signals through different sides of device 10. For example, device 10 may include at least first antenna 40 that conveys radio-frequency signals through the front face of device 10 (e.g., display 14 of FIG. 1) and a second antenna 40 that conveys radio-frequency signals through the rear face of device 10 (e.g., rear housing wall 12R of FIG. 1).

Any desired antenna structures may be used for implementing the antenna 40 that conveys radio-frequency signals through the front face of device 10. In one suitable arrangement that is sometimes described herein as an example, shorted patch antenna structures may be used for implementing the antenna 40 that conveys radio-frequency signals through the front face of device 10. Antennas that are implemented using patch antenna structures may sometimes be referred to herein as patch antennas. Patch antennas that are implemented using shorted patch antenna structures may sometimes be referred to herein as shorted patch antennas. An illustrative shorted patch antenna that may be used to convey radio-frequency signals through the front face of device 10 is shown in FIG. 4.

Figure 4:
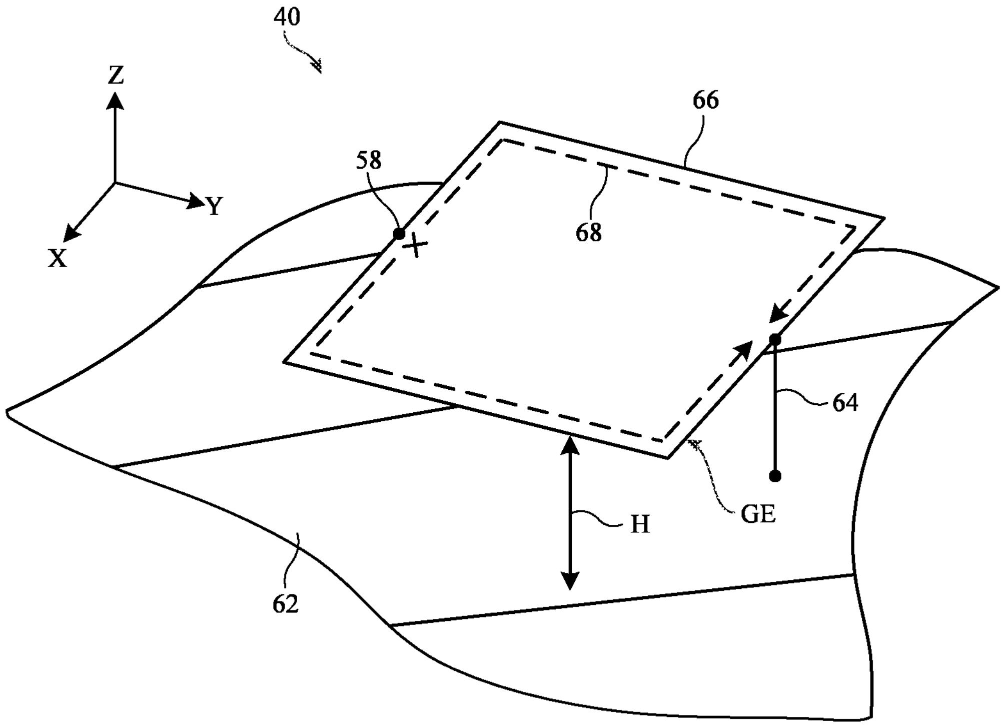
FIG. 4 is a perspective view of an illustrative antenna having a shorted patch element in accordance with some embodiments.

As shown in FIG. 4, antenna 40 may have a radiating patch element such as patch element 66 that is separated from and parallel to an antenna ground such as antenna ground 62 (sometimes referred to herein as ground plane 62 or ground structures 62). Patch element 66 may lie within a plane such as the X-Y plane of FIG. 4 (e.g., the lateral surface area of patch element 66 may lie in the X-Y plane). Patch element 66 may sometimes be referred to herein as patch antenna resonating element 66, patch resonating element 66, patch resonator 66, shorted patch antenna resonating element 66, patch 66, patch radiating element 66, patch antenna radiating element 66, shorted patch antenna radiating element 66, patch radiator 66, patch antenna radiator 66, antenna resonating element 66, or antenna radiating element 66.

Antenna ground 62 may lie within a plane that is parallel to the plane of patch element 66. Patch element 66 and antenna ground 62 may therefore lie in separate parallel planes that are separated by a distance (height) H. Antenna ground 62 may be formed from conductive traces patterned on a dielectric substrate such as a rigid or flexible printed circuit board substrate, metal foil, stamped sheet metal, electronic device housing structures, or any other desired conductive structures (e.g., ground structures). Patch element 66 may be formed from electronic device housing structures, conductive display structures, and a canted coil spring, as one example.

The length of the sides of patch element 66 may be selected so that antenna 40 resonates (radiates) at desired operating frequencies. For example, the sides of patch element 66 may each have a length that is approximately equal to half of the wavelength of the signals conveyed by antenna 40 (e.g., the effective wavelength given the dielectric properties of the materials surrounding patch element 66). Positive antenna feed terminal 58 may be coupled to patch element 66 (e.g., at a feed edge of patch element 66).

One or more grounding structures such as grounding structure 64 may couple patch element 66 to antenna ground 62. Grounding structure 64 may, for example, couple a ground edge GE of patch element 66 to antenna ground 62. Ground edge GE may be the edge opposite to the feed edge of patch element 66, for example. Grounding structure 64 may include an integral portion of patch element 66 that is bent or folded towards antenna ground 62, conductive traces, sheet metal, solder, welds, conductive adhesive, conductive foam, metal foil, a conductive portion of the housing of device 10, a conductive spring, a conductive gasket, a conductive bracket, a conductive clip, a conductive prong, a conductive pin, and/or any other desired conductive structures for coupling (e.g., electrically connecting) patch element 66 to antenna ground 62.

Grounding structure 64 may serve to electrically short patch element 66 to antenna ground 62 at the frequencies of operation of antenna 40. Grounding structure 64 may therefore sometimes be referred to as a short path or return path for patch element 66. This may configure antenna 40 to form a type of patch antenna sometimes referred to as a shorted patch antenna. Grounding structure 64 may configure antenna current to flow along the perimeter of patch element 66 as shown by arrow 68. This length may be selected to configure antenna 40 to convey radio-frequency signals within corresponding frequency bands. The antenna current may be produced by positive antenna feed terminal 58 (e.g., during signal transmission) or by incident radio-frequency signals received by antenna 40. During signal reception, the antenna current may pass the radio-frequency signals to transceiver circuitry on device 10 via positive antenna feed terminal 58.

The example of FIG. 4 is merely illustrative. Patch element 66 may have a square shape in which all of the sides of patch element 66 are the same length or may have a different rectangular shape. Patch element 66 may be formed in other shapes having any desired number of straight and/or curved edges (e.g., a round shape, an elliptical shape, a polygonal shape, etc.). Patch element 66 of antenna 40 may be formed from multiple conductive structures in device 10 in a manner that serves to integrate patch element 66 into device 10 in a way that allows antenna 40 to convey radio-frequency signals through the front face of device 10.

Figure 5:
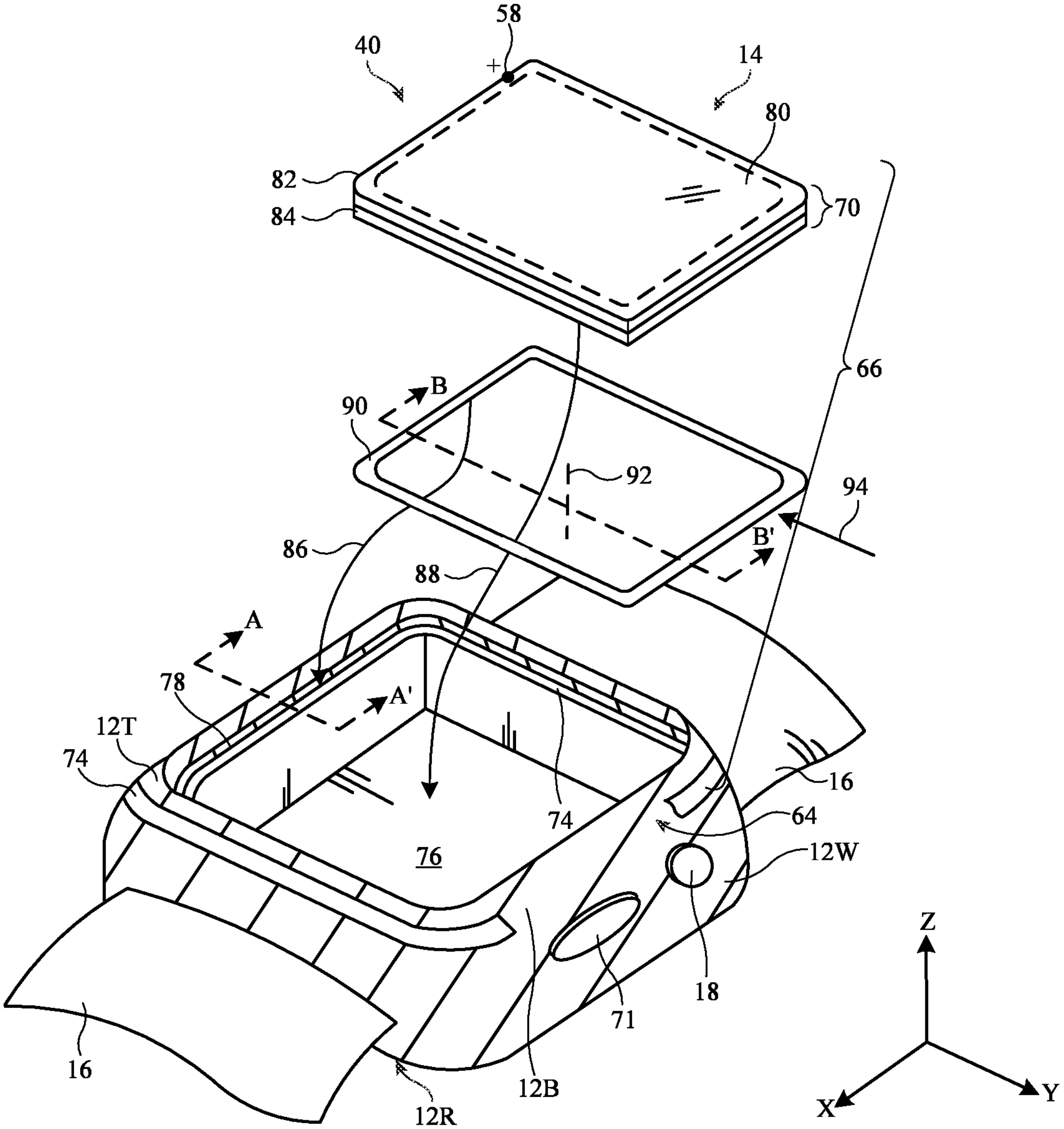
FIG. 5 is a perspective view showing how a shorted patch element of an antenna may be formed from conductive housing structures, conductive display structures, and a ring-shaped canted coil spring in accordance with some embodiments.

FIG. 5 is an exploded perspective view showing how patch element 66 may be formed from multiple conductive structures and integrated into device 10 for conveying radio-frequency signals through the front face of device 10. In the exploded view of FIG. 5, display 14 has been removed from housing 12 to better illustrate its integration into device 10.

As shown in FIG. 5, the housing of device 10 (e.g., housing 12 of FIG. 1) may include conductive housing structures that surround an interior cavity 76 of device 10. The conductive housing structures may include conductive housing sidewalls 12W. Conductive housing sidewalls 12W may run around a lateral periphery of device 10 (e.g., around interior cavity 76). The conductive housing structures may also include a conductive upper portion such as conductive turret 12T. Conductive turret 12T also runs around the lateral periphery of device 10. Conductive turret 12T may sometimes referred to herein as conductive upper portion 12T of housing 12, conductive top portion 12T of housing 12, conductive ring 12T, or conductive bezel 12T.

The housing may include a dielectric-filled slot such as slot 74 that vertically separates conductive turret 12T from conductive housing sidewalls 12W (e.g., that divides the conductive material in housing 12 to separate conductive housing sidewalls 12W from conductive turret 12T). Slot 74 may be filled with injection-molded plastic, ceramic, and/or any other desired dielectric material. Slot 74 may be an elongated slot that extends along one or more of the edges or sides of device 10. Put differently, slot 74 may have a longitudinal axis that extends along one or more edges of device 10.

In the example of FIG. 5, slot 74 is a C-shaped or U-shaped slot that extends along (e.g., has a longitudinal axis that extends along) three of the four sides of device 10 and along portions of a fourth side of device 10 (e.g., in an implementation where device 10 has a rectangular housing). More generally (e.g., for implementations where device 10 has a circular or elliptical housing), slot 74 may extend around at least 210, 270, 300, 330, 345, 350, or 210-350 degrees of the housing (e.g., when measured around the Z-axis), as examples.

The conductive structures in housing 12 may also include a conductive bridging portion such as conductive bridge 12B. Conductive bridge 12B couples conductive turret 12T to conductive housing sidewalls 12W at the portion of housing 12 that is not divided by slot 74. In other words, slot 74 extends from a first edge of conductive bridge 12B, around the periphery of device 10, to an opposing second edge of conductive bridge 12B (e.g., conductive bridge 12B bridges slot 74) while vertically separating conductive turret 12T from conductive housing sidewalls 12W. Conductive housing sidewalls 12W and conductive turret 12T may respectively define opposing first and second edges of slot 74 that extend along the length of slot 74. Conductive bridge 12B may define third and fourth edges (ends) of slot 74 (e.g., where the third and fourth edges are significantly shorter than the first and second edges).

Conductive bridge 12B may, for example, couple conductive turret 12T to conductive housing sidewalls 12W at the fourth side/edge of device 10 having buttons 18 and/or vents 71 (e.g., speaker vents, barometric vents, water release vents, etc.). Conductive bridge 12B may extend across some or all of the fourth edge of device 10 (e.g., 5% of the fourth edge, 10% of the fourth edge, 10-50% of the fourth edge, 25-75% of the fourth edge, more than 50% of the fourth edge, 50-90% of the fourth edge, 100% of the fourth edge, etc.). If desired, conductive turret 12T, conductive bridge 12B, and conductive housing sidewalls 12W may be formed from integral portions of a single piece of machined metal to maximize the mechanical strength and aesthetic characteristics of device 10 (e.g., in a unibody configuration).

As shown in FIG. 5, display 14 may include conductive display structures 70. Conductive display structures 70 may include conductive material in or on a display board 80 for display 14 (sometimes referred to herein as display module 80 or display printed circuit 80). Display board 80 may include a main logic board (MLB) for the display. Display board 80 may have control electronics (e.g., display drivers), control lines (traces), power lines (traces), ground lines (traces), and other conductive structures on a dielectric substrate (e.g., a rigid or flexible printed circuit substrate). Display 14 may also include pixel circuitry (e.g., an array of display pixels), touch sensor circuitry (e.g., an array of resistive or capacitive touch sensors), and/or force sensor circuitry on display board 80. Some or all of these portions of display board 80 may form part of conductive display structures 70.

Conductive display structures 70 may also include a ring of conductive material 84 coupled to display board 80. The ring of conductive material 84 may sometimes be referred to herein as antenna ground ring (AGR) 84, ground ring 84, or conductive ring 84. Conductive ring 84 may extend along the lateral periphery of display board 80. Conductive ring 84 may be mechanically attached or secured, using adhesive, solder, welds, clips, brackets, screws, pins, and/or any other desired conductive interconnect structures, to the bottom surface of display board 80 (e.g., facing interior cavity 76) and/or to other structures mounted or coupled to display board 80. Conductive ring 84 may also be electrically coupled to conductive structures in display board 80 (e.g., ground traces or other grounded structures in display board 80, a shielding can or conductive frame for display board 80, etc.).

Conductive ring 84 may be embedded in a plastic substrate on display 14 (e.g., over-molded plastic). If desired, conductive ring 84 may include one or more protrusions, clips, tabs, brackets, spring fingers, springs, pins, and/or other conductive structures that protrude from the plastic substrate and that serve to electrically couple conductive ring 84 to other components such as canted coil spring 90 when mounted in device 10. While referred to herein as a ring, conductive ring 84 need not have a ring shape and may be planar, may include bent or folded sheet metal, may form a frame for display board 80, etc. Conductive display structures 70 may additionally or alternatively include a conductive display frame (e.g., a frame for display board 80), conductive shielding structures (e.g., shielding cans for one or more of the components on the display board), conductive adhesive, an embedded near-field communications antenna within display 14 or on or in the display board, etc.

In some implementations, display 14 also includes an additional conductive ring separate from conductive display structures 70 (sometimes referred to herein as a wave ring). The wave ring can be used to couple conductive display structures 70 to conductive turret 12T when display 14 is mounted onto device 10. The wave ring is formed from a metal such as stainless steel and is welded, soldered, or adhered to conductive turret 12T when display 14 is mounted to device 10. This forms a permanent connection between conductive display structures 70 and conductive turret 12T, making display 14 difficult or impossible to remove from device 10 (e.g., for repairing or replacing display 14 and/or other components within device 10).

In addition, welds, solder, or adhesive form an inconsistent electrical connection (e.g., a stronger connection at the location of the welds, solder, or adhesive than at locations without welds, solder, or adhesive) between conductive display structures 70 and conductive turret 12T. This can produce an unstable or inconsistent radio-frequency impedance between conductive structures 70 and conductive turret 12T and between conductive display structures 70 and conductive bridge 12B, which can deteriorate the radio-frequency performance of an antenna having a patch element formed from conductive display structures 70, the wave ring, and conductive turret 12T.

To mitigate these issues, the wave ring may be replaced by a canted coil spring such as canted coil spring 90. Canted coil spring 90 may sometimes also be referred to herein as a canted coil, a canted spring, a slant spring, a canted seal spring, or a canted wire wound spring. Canted coil spring 90 may include loops, windings, turns, or coils of conductive material such as conductive wire or metal strips wound outside of the X-Y plane. In the example of FIG. 5, canted coil spring 90 is a ring-shaped canted coil spring in which the windings of conductive material in the canted coil spring collectively follow a ring-shaped or loop-shaped path in the X-Y plane about a central axis 92 parallel to the Z-axis. In these implementations, the ends of the conductive material in canted coil spring 90 are attached together (e.g., using a weld). When implemented as a ring-shaped canted coil spring, canted coil spring 90 may sometimes also be referred to herein as a ring-shaped canted coil spring, a canted coil spring ring, a canted coil ring, a canted spring ring, a ring-shaped slant spring, a slant spring ring, a ring-shaped canted seal spring, a canted seal spring ring, a canted wire wound spring ring, or a ring-shaped canted wire wound spring.

When device 10 is assembled, canted coil spring 90 may be mounted to conductive turret 12T, as shown by arrow 86. Conductive turret 12T may, for example, have a recess 78 at or facing interior cavity 76. Recess 78 may sometimes also be referred to herein as notch 78 or groove 78 in conductive turret 12T. Canted coil spring 90 may be mounted to conductive turret 12T within recess 78 (e.g., canted coil spring 90 may be placed or disposed within recess 78). When placed within recess 78, at least a portion of the windings of canted coil spring 90 may protrude beyond or outside of recess 78 and into interior cavity 76.

Once canted coil spring 90 has been disposed within recess 78, display 14 may then be mounted to conductive turret 12T, as shown by arrow 88. When mounted to conductive turret 12T, conductive display structures 70 in display 14 may press laterally outwards against canted coil spring 90 within recess 78. Canted coil spring 90 may contact both conductive turret 12T and conductive display structures 70 around an entire periphery of display 14. This may form an electrical connection between conductive turret 12T and conductive display structures 70 around the entire periphery of display 14.

In this way, when device 10 is fully assembled, canted coil spring 90, conductive display structures 70, and conductive turret 12T may collectively form a single electrical structure (e.g., a unitary conductive structure) that forms patch element 66 of antenna 40. When pressed into recess 78 by display 14, canted coil spring 90 may exert a spring force against both conductive turret 12T and conductive display structures 70. This may help to form a robust, reliable, constant, and strong electrical connection between conductive turret 12T and conductive display structures 70 around the entire periphery of display 14 without the use of conductive adhesive, solder, or welds. The strong electrical connection may minimize impedance discontinuities (e.g., may form a smooth impedance transition) between conductive display structures 70 and conductive turret 12T at the radio frequencies of antenna 40, which serves to optimize the radiation pattern of patch element 66 and maximizes the antenna efficiency of antenna 40. In addition, since no adhesive, solder, or welds are needed to electrically couple conductive display structures 70 to conductive turret 12T, display 14 may be easily removed from device 10 after assembly (e.g., to replace or repair display 14 and/or components within interior cavity 76).

Positive antenna feed terminal 58 may be coupled to conductive display structures 70 (e.g., conductive ring 84, a conductive tab or bracket coupled to conductive ring 84 and/or a portion of display board 80, a conductive frame in conductive structures 70, etc.). Alternatively, positive antenna feed terminal 58 may be coupled to conductive turret 12T (e.g., a conductive tab, bracket, or screw on or coupled to conductive turret 12T). The dielectric material in slot 74 may serve to electrically separate patch element 66 (e.g., canted coil spring 90, conductive display structures 70, and conductive turret 12T) from the antenna ground in antenna 40 (e.g., antenna ground 62 of FIG. 4).

The antenna ground may be formed from conductive housing sidewalls 12W, conductive portions of rear housing wall 12R, and/or grounded structures within interior cavity 76 (e.g., ground traces, conductive housing structures, conductive portions of one or more components disposed within interior cavity 76, etc.). Conductive bridge 12B may couple patch element 66 to the antenna ground (e.g., to conductive housing sidewalls 12W). Conductive bridge 12B may therefore form grounding structure 64 (FIG. 4) for patch element 66 and antenna 40 and patch element 66 may be a shorted patch element. Positive antenna feed terminal 58 may, for example, be coupled to patch element 66 at the side of device 10 opposite to conductive bridge 12B. When antenna 40 conveys radio-frequency signals, antenna currents run along the periphery of patch element 66 (e.g., along conductive turret 12T).

Integrating antenna 40 into display 14 and device 10 in this way may allow antenna 40 to convey radio-frequency signals through the front face of device 10 while extending the radiating area (volume) of antenna 40 to include essentially all of the lateral area available within device 10. This may serve to maximize the bandwidth of antenna 40 for covering multiple frequency bands of interest (e.g., including both the GPS L1 and GPS L5 bands in addition to the cellular HB).

In other implementations, the radiating edge of the patch element is defined by a slot that lies within the planar front face of display 14 (e.g., in the X-Y plane). In these implementations, display 14 needs to include an inactive area around its periphery overlapping the slot to allow the antenna to radiate properly. The presence of the inactive area limits both the antenna volume and the size of the active area of display 14 available for pixel circuitry that displays images to a user, thereby limiting the size of images viewable by the user. By moving the slot and thus the radiating edge of patch element 66 into the peripheral sides of device 10 (e.g., by forming slot 74 within the periphery of device 10 rather than within the plane of the front face of device 10), the inactive area for display 14 can be reduced or eliminated, thereby maximizing the size of the active area on display 14 available for pixel circuitry that displays images and thus the size of the images viewable by the user.

Figure 6:
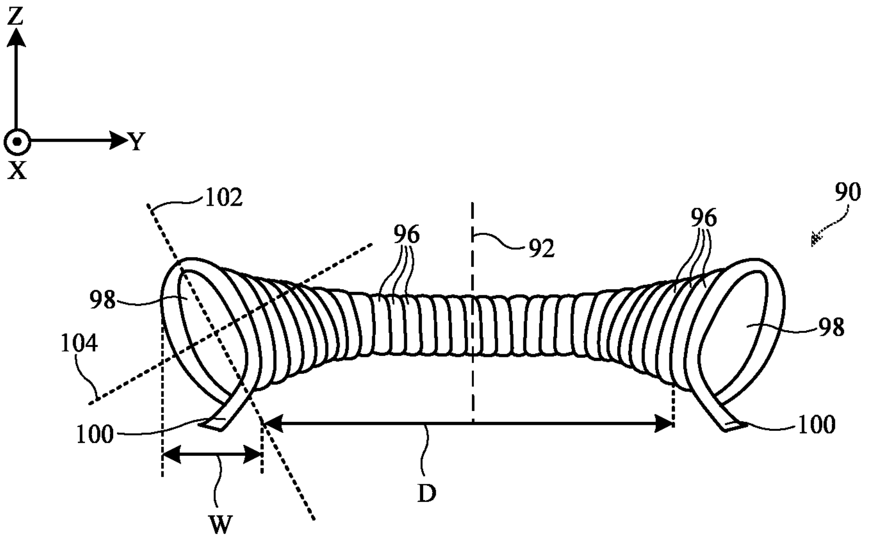
FIG. 6 is a cross-sectional side view of an illustrative canted coil spring in accordance with some embodiments.

FIG. 6 is a cross-sectional side view of canted coil spring 90 (e.g., as taken in the direction of line BB' of FIG. 5). As shown in FIG. 6, canted coil spring 90 may include multiple windings 96 of conductor 100. Each winding 96 may wrap around a corresponding opening 98. Windings 96 may sometimes also be referred to herein as turns 96, coils 96, or loops 96 of conductor 100. Windings 96 may be outside of the X-Y plane and may collectively wrap around central axis 92, causing canted coil spring 90 to have a ring-shape when viewed in the +Z or −Z direction (e.g., when canted coil spring 90 is implemented as a ring-shaped canted coil spring).

Conductor 100 may be a wire or a strip of conductive material. The wire may have a circular cross-section, an elliptical cross-section, or other cross-sections. The strip of conductive material may have a planar cross section, may have opposing first and second lateral surfaces coupled together at sharp or rounded corners, or by first and second sidewalls that are substantially narrower than the first and second lateral surfaces, for example.

The windings 96 of conductor 100 in canted coil spring 90 are canted. As such, canted coil spring 90 is a non-helical spring, the openings 98 surrounded by windings 96 of conductor 100 are elliptical rather than circular, and windings 96 and openings 98 are tilted or angled over each other. Each opening 98 therefore has a respective major axis 102 (e.g., a longest or longitudinal dimension of openings 98) and an orthogonal minor axis 104 that is shorter than major axis 102. When implemented as a ring-shaped canted coil spring, when canted coil spring 90 is deflected, the windings 98 of canted coil spring 90 may deflect in the radial direction away from central axis 92.

Canted coil spring 90 may have an inner diameter D (e.g., defined between the inner edge of windings 96 facing central axis 92). Canted coil spring 90 may also have a coil width W (e.g., measured parallel to inner diameter D and given by the width of opening 98, the diameter of conductor 100, and the tilt of major axis 102). To fit within recess 78 while still forming a robust electrical connection between conductive turret 12T and conductive display structures 70, the ratio of inner diameter D to width W may be 50-70, 55-65, 58-62, 60, greater than 40, greater than 30, greater than 20, greater than 10, 10-70, or other relatively large values.

Figure 7:
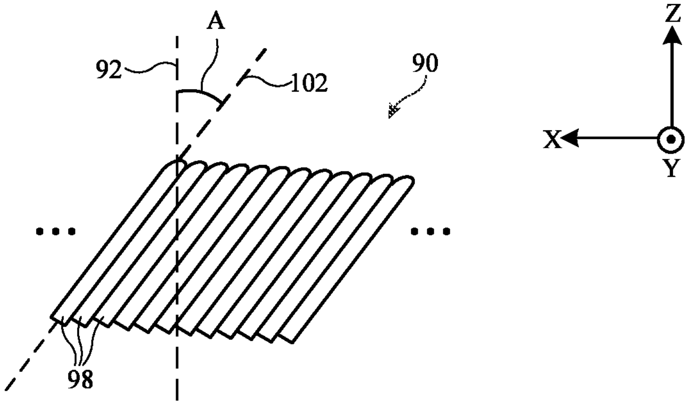
FIG. 7 is a side view of an illustrative canted coil spring in accordance with some embodiments.

FIG. 7 is a side view of a segment of canted coil spring 90 (e.g., as taken in the direction of arrow 94 of FIG. 5. As shown in FIG. 7, windings 96 as well as the major axis 102 of the openings 98 (FIG. 6) in windings 96 of canted coil spring 90 may be tilted (canted) over each other at a non-parallel angle A with respect to central axis 92 (e.g., the Z-axis of FIG. 7).

Figure 8:
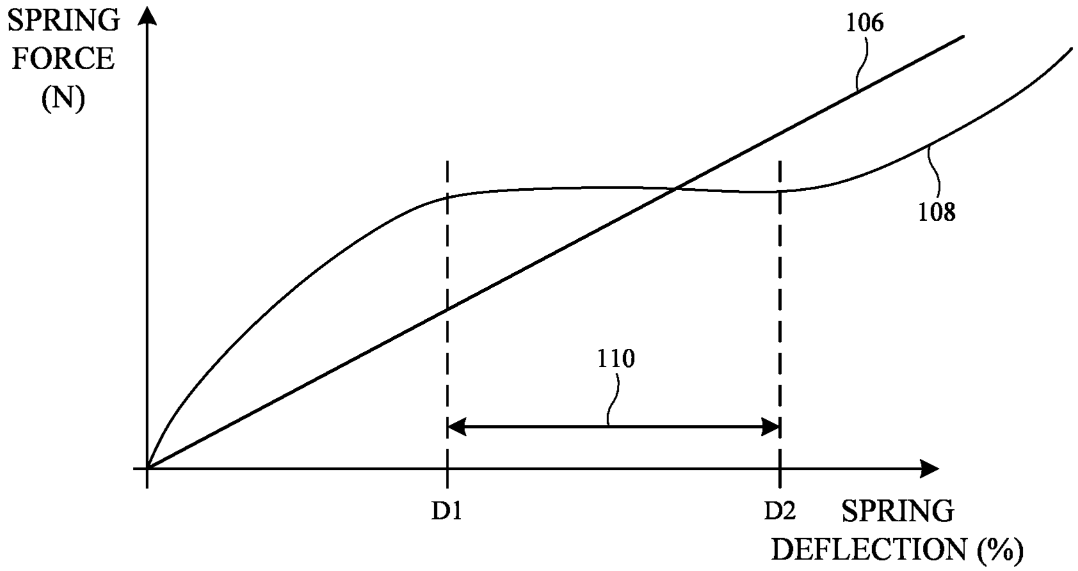
FIG. 8 is a plot of the spring force characteristic of an illustrative canted coil spring in accordance with some embodiments.

FIG. 8 is a plot showing how the spring force characteristic of canted coil spring 90 may differ from that of a non-canted coil spring. Curve 106 plots the spring characteristic (e.g., spring force as a function deflection) of a non-canted spring (sometimes also referred to herein as a linear or helical spring). As shown by curve 106, a non-canted coil spring exhibits a linear spring force as the spring is deflected.

Curve 108 plots the spring characteristic of canted coil spring 90. As shown by curve 108, canted coil spring 90 may have a non-linear spring force characteristic. Canted coil spring 90 may exhibit a relatively constant spring force over a range 110 of deflections from D1 to D2. In other words, when canted coil spring 90 is compressed or stretched by a deflection within range 110, the force exerted by canted coil spring 90 remains constant. This may, for example, help canted coil spring 90 to form a stable, constant, and consistent electric connection between conductive display structures 70 and conductive turret 12T (e.g., when deflected between deflections D1 and D2). When canted coil spring 90 is a ring-shaped canted coil spring, this stable spring force may be exerted radially away from central axis 92 in a constant manner at all angles around central axis 92.

Figure 9:
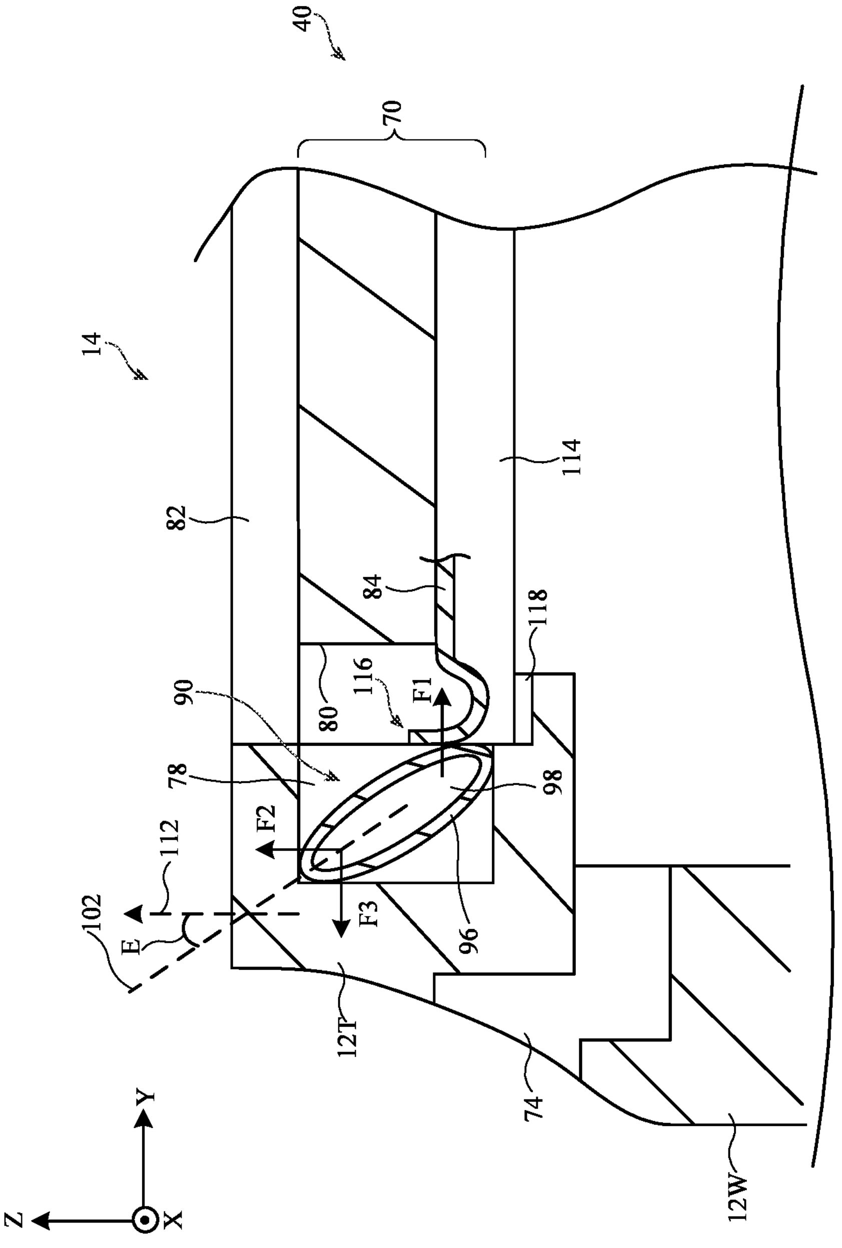
FIG. 9 is a cross-sectional side view showing how an illustrative canted coil spring may couple conductive display structures to conductive housing structures to form an integrated shorted patch element of an antenna in accordance with some embodiments.

FIG. 9 is a cross-sectional side view showing how antenna 40 may be integrated into device 10 when fully assembled (e.g., as taken along line AA' of FIG. 5). As shown in FIG. 9, a conductive housing sidewall 12W of device 10 may extend from the rear face of device 10 (rear housing wall 12R of FIG. 5) towards the front face of device 10. Conductive turret 12T may be vertically separated from the upper edge of conductive housing sidewall 12W by slot 74. Slot 74 may be filled with dielectric material. Slot 74 may sometimes also be referred to herein as gap 74 or housing split 74.

Display 14 may include display cover layer 82 layered onto conductive display structures 70 (e.g., display board 80). Pixel circuitry in display board 80 may emit light through display cover layer 82. Conductive display structures 70 may include conductive ring 84. Display board 80 may be mounted to conductive ring 84. Conductive adhesive, solder, welds, and/or any other desired conductive interconnect structures may couple conductive ring 84 to display board 80 and/or conductive ring 84 may be formed from part of a conductive bracket or frame for display board 80. If desired, a substrate such as plastic overmold 114 may be molded over display board 80 and conductive ring 84 in display 14 (e.g., display board 80 and conductive ring 84 may be embedded within plastic overmold 114).

Conductive ring 84 may have a portion or conductive member such as protrusion 116 that protrudes through plastic overmold 114 and that is exposed at the edge of display 14. Protrusion 116 may include a conductive tab or blade, a conductive finger, a conductive spring (e.g., a spring finger), a conductive pin, an extended piece of bent or folded sheet metal, and/or any other desired protrusion through plastic overmold 114. Protrusion 116 of conductive ring 84 may protrude through plastic overmold 114 at a set of discrete points around the lateral periphery of display 14 or may extend through plastic overmold 114 continuously around the lateral periphery of display 14.

Canted coil spring 90 may be disposed within recess 78 of conductive turret 12T. FIG. 9 shows a cross-sectional side view of a single winding 96 of canted coil spring 90 while disposed in recess 78. Prior to mounting display 14 to device 10 (e.g., as shown in FIG. 5), part of canted coil spring 90 may extend outside of recess 78. When display 14 is mounted to conductive turret 12T, display 14 is pressed downwards into an opening laterally surrounded by conductive turret 12T. At the same time, the peripheral edges of display 14 (e.g., plastic overmold 114 and/or protrusion 116) may press laterally against canted coil spring 90, compressing canted coil spring 90 into recess 78. Display 14 (e.g., plastic overmold 114) may be secured to conductive turret 12T using adhesive 118 (e.g., an adhesive gasket or ring-shaped layer) disposed on a ledge or datum of conductive turret 12T. Alternatively, adhesive 118 may be replaced with an adhesive-free gasket or seal member to make display 14 easier to remove.

When canted coil spring 90 is compressed into recess 78, canted coil spring 90 may contact both conductive turret 12T and protrusion 116 of conductive ring 84. This may form an electrical connection between conductive turret 12T and conductive ring 84, thereby forming a single continuous patch element for antenna 40 using conductive turret 12T, canted coil spring 90, and conductive display structures 70.

The compression of canted coil spring 90 by the peripheral edges of display 14 may cause the windings 96 of canted coil spring 90 to tilt away from the normal axis 112 of the lateral (exterior) surface of display cover layer 82. This may compress the opening 98 of windings 96 such that opening 98 has an elliptical shape with a major axis 102 tilted away from normal axis 112 by a non-zero angle E. This compression and tilting of windings 96 may cause canted coil spring 90 to exert components of its spring force in different directions.

For example, as shown in FIG. 9, the windings 96 of canted coil spring 90 may exert a spring force F having at least a first component F1 pointed laterally away from canted coil spring 90 and towards (into) protrusion 116 of conductive ring 84 (in the +Y direction), a second component F2 pointed vertically upwards away from canted coil spring 90 and towards (into) the top of conductive turret 12T (in the +Z direction), and a third component F3 pointed laterally away from canted coil spring 90 and towards (into) the side of conductive turret 12T (in the −Y direction opposite component F1). This may serve to form a stable and consistent electrical connection between conductive turret 12T and conductive display structures 70 (e.g., more stable and consistent than when the spring force is only exerted by canted coil spring 90 horizontally along the Y-axis) that is mechanically robust to external forces that may be applied to display 14, thereby ensuring that antenna 40 has a stable and consistent patch element and optimizing the wireless performance of antenna 40 over time. At the same time, since canted coil spring 90 is not welded, soldered, or adhered to any other components, display 14 may be easily removable from device 10.

Figure 10:
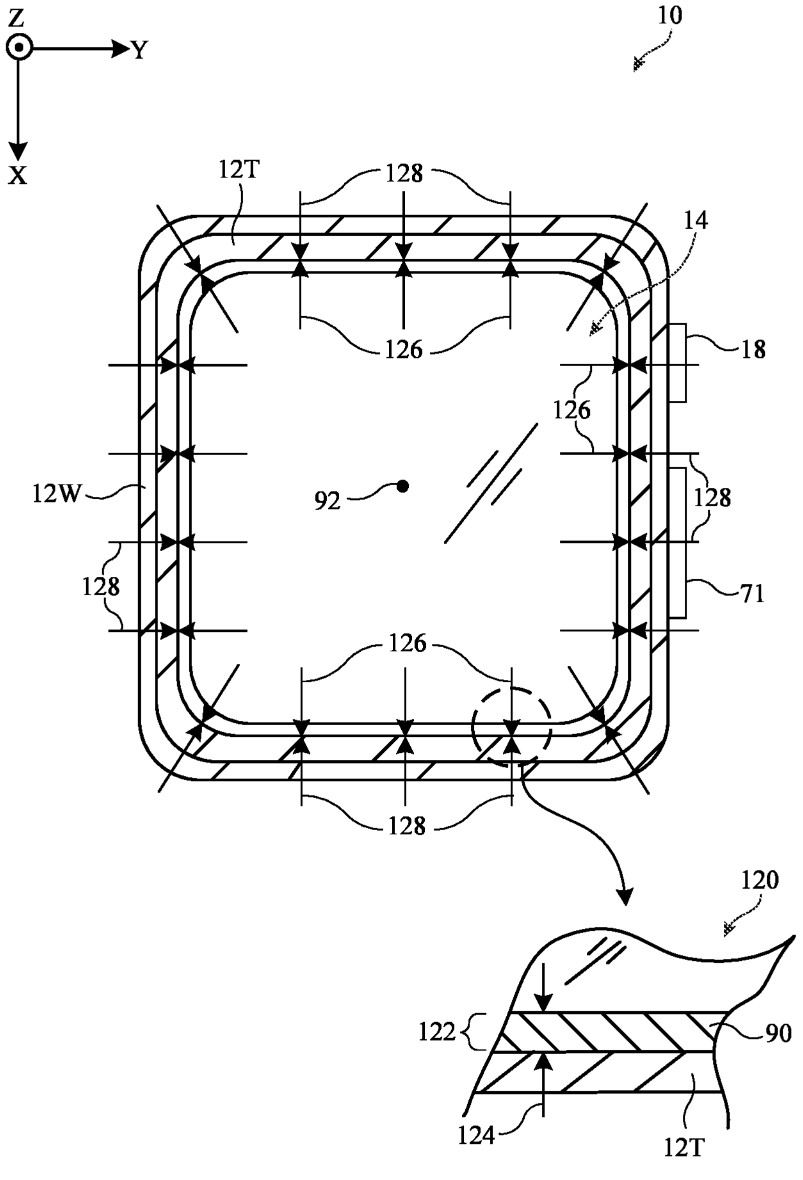
FIG. 10 is a top-down view of an illustrative electronic device showing how a ring-shaped canted coil spring may provide a consistent spring force between conductive display structures and conductive housing structures in accordance with some embodiments.

In addition, when implemented as a ring-shaped canted coil spring, canted coil spring 90 may provide this stable spring force and thus a stable electrical connection between conductive turret 12T and conductive display structures 70 at all points around the lateral periphery of display 14. FIG. 10 is a top view of device 10 showing how canted coil spring 90 may provide a stable spring force and electrical connection at all points around the lateral periphery of display 14.

As shown in FIG. 10, when display 14 is mounted to conductive turret 12T, the compression of canted coil spring 90 by display 14 and conductive turret 12T may cause canted coil spring 90 to exert a lateral spring force radially inwards towards display 14, as shown by arrows 128, and conversely radially outwards towards conductive turret 12T, as shown by arrows 126. Since canted coil spring 90 runs along the entire periphery of display 14, canted coil spring 90 exhibits this spring force in a constant manner at all angles around central axis 92 (e.g., at all points along the lateral periphery of display 14 and along conductive turret 12T).

As shown by exploded portion 120 of FIG. 10, there may be a gap 122 present between display 14 and conductive turret 12T when display 14 is mounted to device 10. Part of canted coil spring 90 may overlap gap 122 and may help to ensure that a robust electrical connection is maintained between display 14 and conductive turret 12T at all angles around central axis 92, even in situations where display 14 is misaligned or not precisely aligned with conductive turret 12T. This may, for example, allow for reduced placement tolerance for display 14 when assembling device 10, without significantly affecting the performance of antenna 40.

In the examples of FIGS. 5-10, canted coil spring 90 is shown as following a ring-shaped path (e.g., canted coil spring 90 is shown as a ring-shaped canted coil spring). This is merely illustrative. If desired, canted coil spring 90 may be a non-ring-shaped canted coil spring (e.g., a canted coil spring having opposing first and second ends that are not connected or welded together). In these implementations, canted coil spring 90 may extend along some but not all of the lateral periphery of display 14. In addition, the first and second ends of the canted coil spring may be attached to conductive turret 12T (e.g., using pins, clips, blocks, spring stops, solder, welds, etc.).

Figure 11:
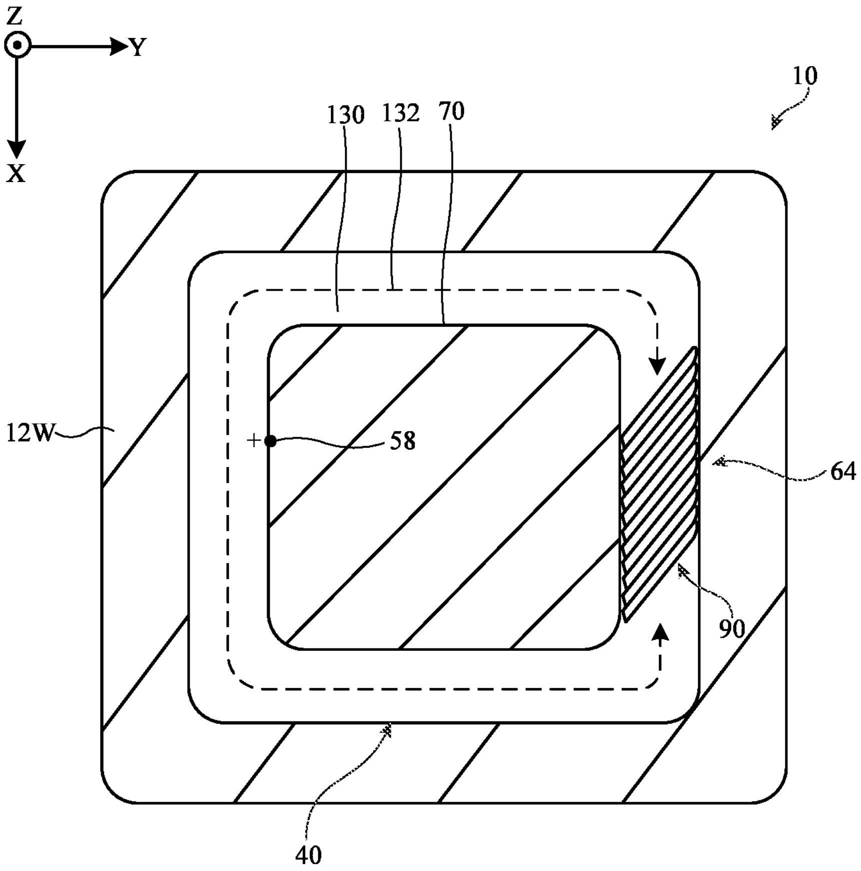
FIG. 11 is a top-down view showing how an illustrative canted coil spring may be used to short conductive display structures to ground to define edges of a slot antenna resonating element in accordance with some embodiments.

If desired, such a non-ring-shaped canted coil spring 90 may be used to define edges of a slot antenna formed from conductive housing structures and conductive display structures 70. FIG. 11 is a top-down view showing a non-ring canted coil spring 90 may be used to define an edge of a slot antenna formed from conductive housing structures and conductive display structures 70.

As shown in FIG. 11, when display 14 is mounted to device 10, conductive display structures 70 may be separated from conductive housing structures such as conductive housing sidewalls 12W (or conductive turret 12T) by a slot such as slot 130. Slot 130 may follow a meandering path and may have edges defined by different conductive electronic device structures. For example, slot 130 may have an elongated meandering shape with a longitudinal axis 132 extending around conductive display structures 70. A non-ring-shaped canted coil spring 90 may be disposed in slot 130 and may couple conductive display structures 70 to conductive housing sidewalls 12W. The ends of the canted coil spring may be attached to conductive display structures 70 and/or conductive housing sidewalls 12W to hold the spring in place.

Slot element 130 may have opposing first and second sides extending along longitudinal axis 132 and defined by conductive display structures 70 and conductive housing sidewalls 12W respectively. Slot element 130 may have opposing third and fourth sides (ends) defined by the non-ring canted coil spring. Positive antenna feed terminal 58 may convey antenna currents around the perimeter of slot 130 (e.g., through conductive housing sidewalls 12W, conductive display structures 70, and the canted coil spring). The length longitudinal axis 132 may be selected to be approximately equal to one-half of the wavelength of operation of antenna 40, for example (e.g., an effective wavelength of operation of antenna 40 given dielectric loading conditions at slot 130). This may configure slot 130 to form a slot antenna resonating element for antenna 40 (e.g., antenna 40 may be a slot antenna).

Figure 12:
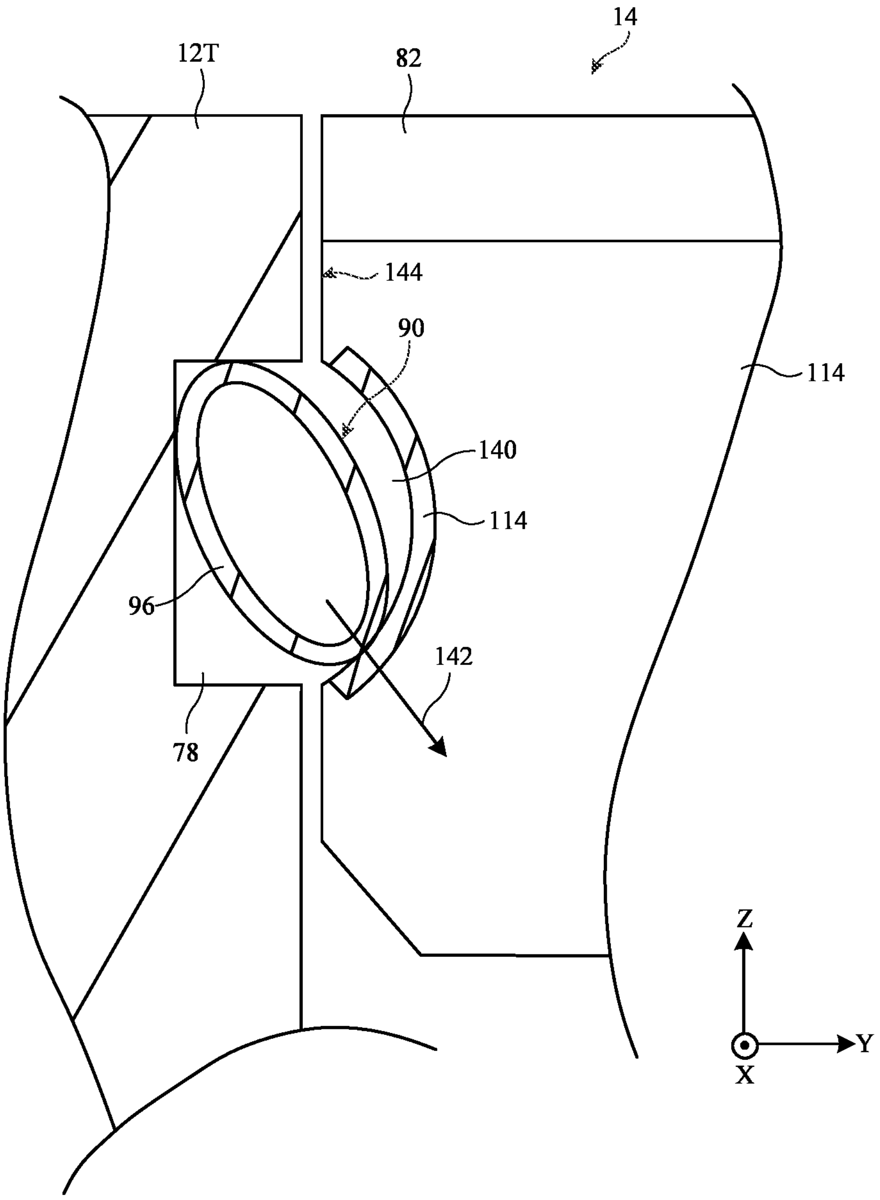
FIG. 12 is a cross-sectional side view showing how the peripheral edge of an illustrative display may include a recess for a canted coil spring in accordance with some embodiments.

If desired, display 14 may have a recess that accommodates canted coil spring 90. FIG. 12 is a cross-sectional side view showing one example of how display 14 may have a recess that accommodates canted coil spring 90. As shown in FIG. 12, display 14 may have a peripheral edge 144 facing conductive turret 12T. Peripheral edge 144 may define vertical sidewalls of display 14 (e.g., orthogonal to the lateral exterior face of display cover layer 82). While peripheral edge 144 may be completely planar, peripheral edge 144 may, if desired, have a recess 140 (sometimes referred to herein as notch 140, cavity 140, or detent 140) overlapping canted coil spring 90. Recess 140 may be within plastic overmold 114 and/or any other desired portion of display 14. Protrusion 116 of conductive ring 84 may be disposed within recess 140. Recess 140 may extend along some or all of the lateral periphery of display 14 (e.g., following a ring-shaped or loop-shaped path).

When placed in recess 78 of conductive turret 12T, part of canted coil spring 90 may also lie within recess 140. Canted coil spring 90 may exert a spring force 142 against protrusion 116 within recess 140. The geometry of recess 140 may determine the direction of spring force 142. In the example of FIG. 12, spring force 142 is angled downwards. This may help to compress a gasket or adhesive (see, e.g., adhesive 118 of FIG. 9) to provide a strong seal between the internal cavity of device 10 and the external environment. The downward component of spring force 142 may allow adhesive 118 to be replaced with a non-adhesive gasket, for example, since the spring force helps to hold display 14 in place to reinforce the seal between display 14 and the rest of device 10.

Figure 13:
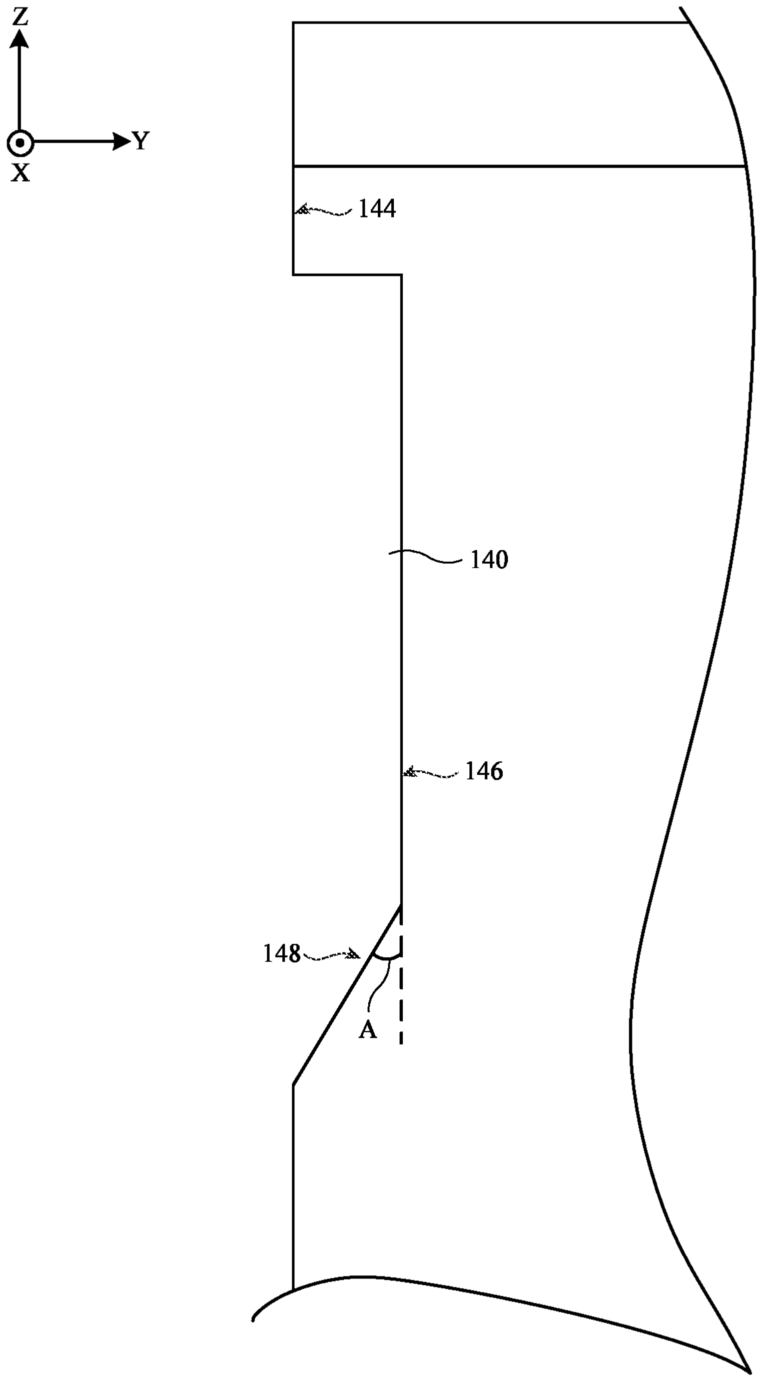
FIG. 13 is a cross-sectional side view showing how a recess in an illustrative display may have an angled edge in accordance with some embodiments.

In the example of FIG. 12, recess 140 has a continuously curved profile. This is merely illustrative. If desired, recess 140 may have an angled edge, as shown in the example of FIG. 13. In the example of FIG. 13, canted coil spring 90 and conductive turret 12T have been omitted for the sake of clarity. As shown in FIG. 13, recess 140 may have a rear wall or edge 146 and an angled edge 148 that couples edge 146 to the rest of peripheral edge 144 of display 14. Angle edge 148 may extend at a non-parallel and non-perpendicular angle A with respect to edge 146 and peripheral edge 144. Adjusting angle A may serve to adjust the force required to insert and extract display 14 from the rest of the housing of device 10, to adjust the magnitude and direction of the equilibrium force that canted coil spring 90 exerts on display 14 after insertion, and/or to adjust the angle of the major axis 102 of each winding 96 of canted coil spring 90 (FIG. 9)

relative to the housing and display 14. Angle A may be between 30 degrees and 70 degrees, for example.

Figure 14:
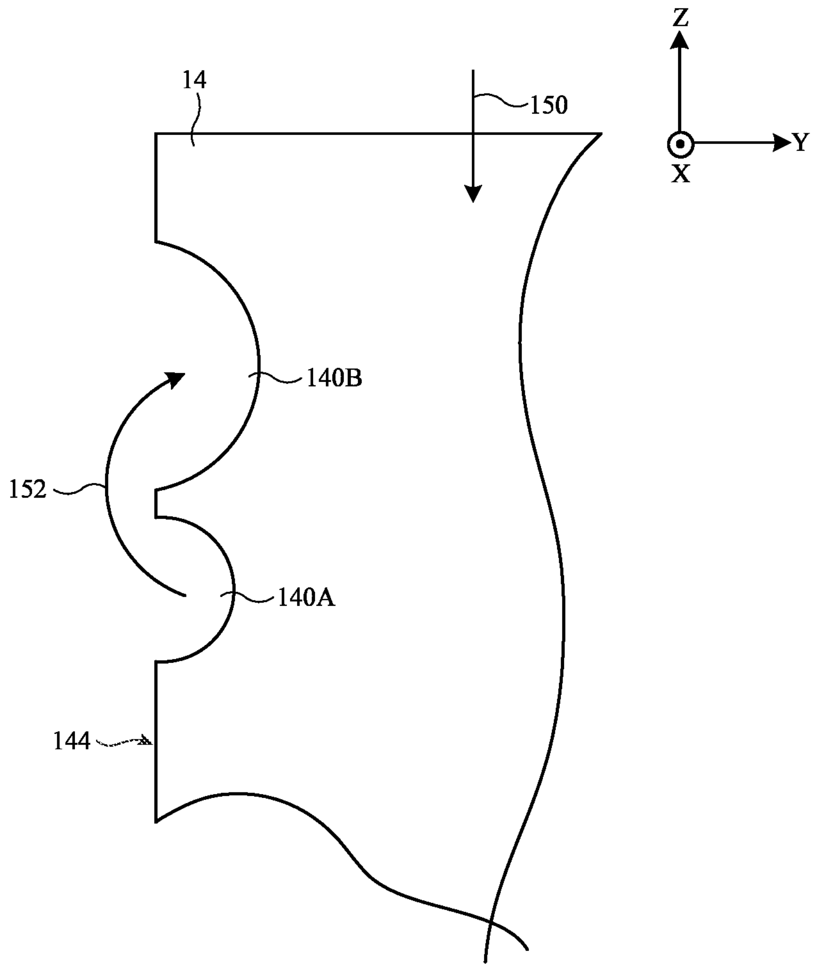
FIG. 14 is a cross-sectional side view showing how the peripheral edge of an illustrative display may include multiple recesses in accordance with some embodiments.

If desired, display 14 may have multiple vertically-overlapping recesses 140 in peripheral edge 144, as shown in the example of FIG. 14. As shown in FIG. 14, peripheral edge 144 may have a first recess 140A and a second recess 140B that is interposed between recess 140A and the exterior surface of display 14. Recess 140B may be larger or otherwise exhibit a different profile than recess 140A. When display 14 is mounted to device 10, canted coil spring 90 (omitted from FIG. 14 for the sake of clarity) may be disposed within recess 140A. When a downward force 150 is applied to display 14, display 14 may move downward causing the canted coil spring to rotate and move from recess 140A to recess 140B, as shown by arrow 152.

When within recess 140B, the canted coil spring may apply less spring force to the conductive turret and the display (e.g., due to the larger size and/or geometry of recess 140B relative to recess 140A). This may allow display 14 to be more easily removed from device 10 than in implementations where peripheral edge 144 only has one recess. Additionally or alternatively, an additional mechanical structure such as a tab, shim, string, lever, trigger, etc. (not shown) may be disposed at one or more locations on the conductive turret along canted coil spring 90 that can be actuated to help reduce the spring force produced by the canted coil spring, thereby allowing display 14 to be more easily removed from device 10 when needed.

Figure 15:
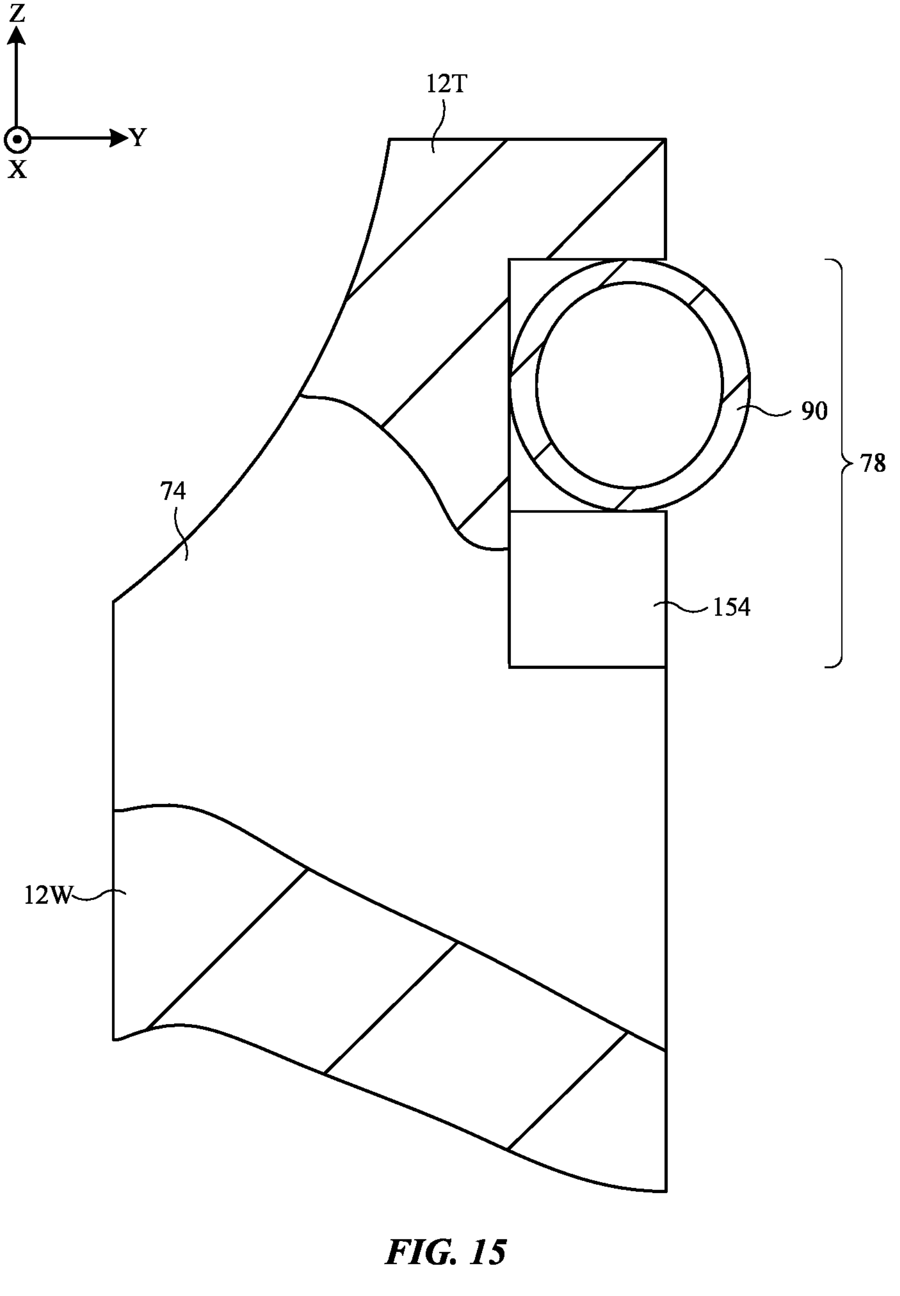
FIG. 15 is a cross-sectional side view showing how a recess in an illustrative conductive turret may be provided with a plastic shim to accommodate a canted coil spring in accordance with some embodiments.

If desired, a shim may be inserted into cavity 78 to help accommodate canted coil spring 90. FIG. 15 is a cross-sectional side view showing one example of how both a shim and canted coil spring 90 may be disposed within cavity 78. In the example of FIG. 15, display 14 has been omitted for the sake of clarity. As shown in FIG. 15, recess 78 may be formed in both conductive turret 12T and, if desired, within the dielectric material of slot 74. A shim such as shim 154 may be inserted into recess 78 (e.g., onto the dielectric material of slot 74). Canted coil spring 90 may be disposed in recess 78 on top of shim 154. Shim 154 may be formed from plastic, for example. Shim 154 may allow canted coil spring 90 to fit within recess 78 in scenarios where recess 78 is otherwise too large for the canted coil spring and/or may help to adjust the dimensions of the canted coil spring and thus the direction of its spring force when display 14 is mounted to device 10, for example.

Figure 16:
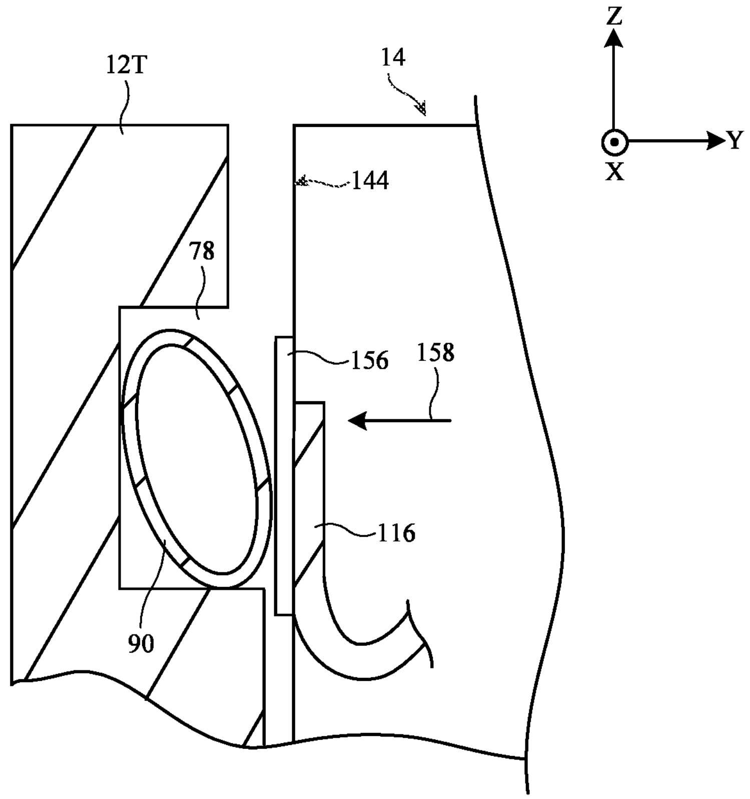
FIG. 16 is a cross-sectional side view showing how a masking material may be layered between a canted coil spring and conductive display structures in accordance with some embodiments.

If desired, a dielectric masking material may be interposed between canted coil spring 90 and protrusion 116 at one or more locations along the lateral periphery of display 14. FIG. 16 is a cross-sectional side view showing how a dielectric masking material may be interposed between canted coil spring 90 and protrusion 116. As shown in FIG. 16, a dielectric masking material such as mask 156 (e.g., an insulative buffer) may be layered onto peripheral edge 144 of display 14. Mask 156 may overlap canted coil spring 90 and protrusion 116. Since mask 156 is non-conductive, mask 156 may prevent conductive contact between canted coil spring 90 and protrusion 116 at locations where mask 156 is interposed between canted coil spring 90 and protrusion 116.

Figure 17:
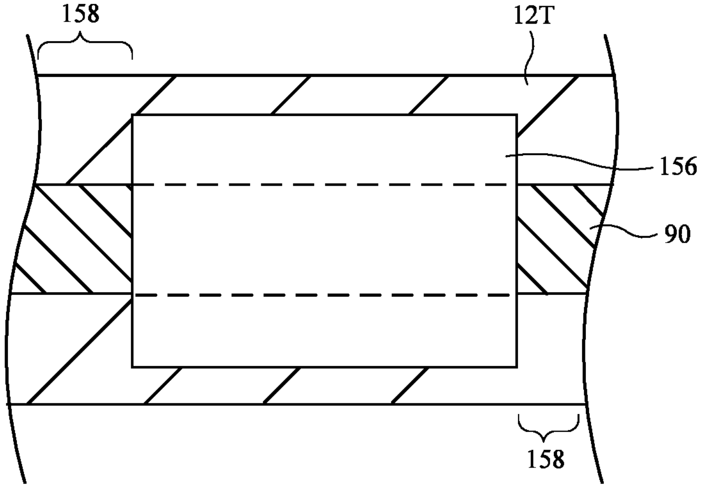
FIG. 17 is a front view showing how a masking material may be layered between a canted coil spring and conductive display structures in accordance with some embodiments.

FIG. 17 is a front view (e.g., as taken in the direction of arrow 158 of FIG. 16) showing how mask 156 may overlap canted coil spring 90. As shown in FIG. 17, mask 156 may overlap canted coil spring 90 and optionally conductive turret 12T. Portions 158 of canted coil spring 90 are free from mask 156. As such, canted coil spring 90 may contact protrusion 116 in display 14 (FIG. 16) within portions 158 but not at portions of the canted coil spring 90 overlapping mask 156. By disposing mask 156 at one or more locations along the lateral periphery of display 14, mask 156 may be used to convert the electrical contact between protrusion 116 and conductive turret 12T from a continuous electrical contact along the length of canted coil spring 90 to a set of discrete electrical contacts. This may help to accommodate the presence of different components within display 14, may adjust the lateral impedance of the patch element of the antenna, and/or may adjust the flow of antenna current between the conductive structures in display 14 and conductive turret 12T (via canted coil spring 90), which may serve to tune the frequency response and the antenna efficiency of antenna 40 across one or more frequency bands. Additionally or alternatively, masking material such as mask 156 may be disposed between canted coil spring 90 and conductive turret 12T.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. An electronic device comprising:
- a housing having conductive sidewalls, a conductive turret, and a conductive bridge;
- a slot that separates the conductive sidewalls from the conductive turret, wherein the conductive bridge couples the conductive turret to the conductive sidewalls across the slot;
- a display mounted to the conductive turret and having conductive structures;
- a canted coil spring that couples the conductive structures in the display to the conductive turret; and
- an antenna having a patch element formed from the conductive turret, the canted coil spring, and the conductive structures and having an antenna ground that includes the conductive sidewalls.

2. The electronic device of claim 1, wherein the conductive turret has a recess and the canted coil spring is disposed in the recess.

3. The electronic device of claim 2, wherein the display has a lateral surface with a normal axis, the canted coil spring has a winding surrounding an elliptical opening with a major axis and a minor axis, and the major axis is tilted at a non-parallel angle with respect to the normal axis.

4. The electronic device of claim 2, further comprising a plastic shim disposed in the recess.

5. The electronic device of claim 1, wherein the display comprises a display board and a display cover layer overlapping the display board, the conductive structures in the display comprising a conductive ring mounted to the display board.

6. The electronic device of claim 5, further comprising:
- a plastic substrate molded over the conductive ring, wherein the conductive ring has a protrusion from the plastic substrate that contacts the canted coil spring.

7. The electronic device of claim 1, wherein the canted coil spring is a ring-shaped canted coil spring that extends around a periphery of the display, the ring-shaped canted coil spring has an inner diameter and a winding width, and a ratio of the inner diameter to the winding width is greater than 20.

8. The electronic device of claim 1, further comprising:

a first recess in the conductive turret and extending along a lateral periphery of the display, wherein the display has a sidewall facing the conductive turret; and a second recess in the sidewall of the display and extending along the lateral periphery of the display, wherein the canted coil spring is disposed in the first and second recesses, wherein the second recess has an angled edge extending at an angle between 30 degrees and 70 degrees relative to the sidewall of the display.

9. The electronic device of claim 8, further comprising:

a third recess in the sidewall of the display and extending along the lateral periphery of the display, the third recess being interposed between the second recess and an exterior surface of the display, and the third recess being larger than the second recess.

10. The electronic device of claim 1, the antenna comprising:

a positive antenna feed terminal coupled to the display at a first side of the electronic device, wherein the conductive bridge is at a second side of the electronic device opposite the first side of the electronic device, the slot extends along at least three sides of the electronic device, and the conductive turret, the conductive sidewalls, and the conductive bridge are formed from respective integral portions of a single piece of metal; and a wrist strap attached to the conductive sidewalls.

11. An electronic device comprising:

an antenna;

a conductive housing having a first portion that forms at least part of a ground for the antenna and a second portion that forms part of a radiator for the antenna;

a display mounted to the conductive housing and having conductive structures; and a canted coil spring that electrically couples the conductive structures to the second portion of the conductive housing.

12. The electronic device of claim 11, wherein the canted coil spring, the conductive structures, and the second portion of the conductive housing forms form at least part of the radiator for the antenna.

13. The electronic device of claim 12, wherein the canted coil spring is a ring-shaped canted coil spring that extends around a lateral periphery of the display.

14. The electronic device of claim 13, wherein the radiator comprises a patch antenna resonating element formed from the second portion of the conductive housing, the canted coil spring, and the conductive structures.

15. The electronic device of claim 13, further comprising:

a recess in the conductive housing and extending around the lateral periphery of the display, the canted coil spring being disposed in the recess.

16. The electronic device of claim 12, wherein the antenna has a slot antenna resonating element, the slot antenna resonating element having edges defined by the first and second portions of the conductive housing, the conductive structures, and the canted coil spring.

17. The electronic device of claim 11, wherein the second portion of the conductive housing comprises a conductive turret and the first portion of the conductive housing comprises a conductive sidewall.

18. An electronic device comprising:

a conductive housing;

a display mounted to the conductive housing;

a canted coil spring that electrically couples conductive structures in the display to the conductive housing;

an antenna radiator that includes the canted coil spring, the conductive structures in the display, and a portion of the conductive housing; and an antenna feed having a first feed terminal coupled to the antenna radiator and having a second feed terminal coupled to a second portion of the conductive housing.

19. The electronic device of claim 18, wherein the conductive housing comprises:

sidewalls, a slot that separates the portion of the conductive housing from the sidewalls, the portion of the conductive housing comprising a conductive ring, and a conductive bridge that couples the conductive ring to the conductive sidewalls across the slot.

20. The electronic device of claim 19, wherein the radiator comprises a patch antenna resonating element.

* * * * *